US011994816B2

(12) United States Patent
Osada et al.

(10) Patent No.: US 11,994,816 B2
(45) Date of Patent: May 28, 2024

(54) FIXING DEVICE

(71) Applicant: CANON KABUSHIKI KAISHA, Tokyo (JP)

(72) Inventors: Hikaru Osada, Kamakura (JP); Toru Imaizumi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/822,706

(22) Filed: Aug. 26, 2022

(65) Prior Publication Data

US 2022/0404748 A1 Dec. 22, 2022

Related U.S. Application Data

(63) Continuation of application No. 17/454,558, filed on Nov. 11, 2021, now Pat. No. 11,454,909, which is a continuation of application No. 17/032,931, filed on Sep. 25, 2020, now Pat. No. 11,194,273, which is a continuation of application No. 16/226,429, filed on Dec. 19, 2018, now Pat. No. 10,824,100.

(30) Foreign Application Priority Data

Dec. 27, 2017 (JP) ................................ 2017-252542

(51) Int. Cl.
*G03G 15/20* (2006.01)

(52) U.S. Cl.
CPC . *G03G 15/2053* (2013.01); *G03G 2215/0132* (2013.01); *G03G 2215/2035* (2013.01)

(58) Field of Classification Search
CPC ....... G03G 15/2053; G03G 2215/2035; G03G 15/2064; G03G 15/2017; G03G 15/206; G03G 15/2028
See application file for complete search history.

(56) References Cited

U.S. PATENT DOCUMENTS 8,923,741 B2 * 12/2014 Imaizumi ........... G03G 15/2053 399/329
10,824,100 B2 * 11/2020 Osada ................ G03G 15/2053
11,194,273 B2 * 12/2021 Osada ................ G03G 15/2053
11,454,909 B2 * 9/2022 Osada ................ G03G 15/2053
2013/0039683 A1 * 2/2013 Fujita ................ G03G 15/2053 399/329

FOREIGN PATENT DOCUMENTS

JP 2014145829 A 8/2014

* cited by examiner

*Primary Examiner* — Jessica L Eley
(74) *Attorney, Agent, or Firm* — Canon U.S.A., Inc. IP Division

(57) ABSTRACT

In a fixing device according to the disclosure, a first surface of a restriction member is inclined so that, as the first surface goes further away from a nip portion, the first surface inclines toward a direction coming closer to an edge surface of the film, and the first surface is inclined so that, as the first surface comes downstream in the conveying direction, the first surface inclines toward a direction going further away from the edge surface of the film. A second surface is inclined so that, as the second surface comes closer to a center in the rotational axis direction of the film, the second surface inclines toward a direction coming closer to a roller, and inclines in a direction going downstream in the conveying direction.

12 Claims, 18 Drawing Sheets

FIXING DEVICE

CROSS REFERENCE OF RELATED APPLICATIONS

This application is a Continuation of U.S. patent application Ser. No. 17/454,558 filed Nov. 11, 2021, which is a Continuation of U.S. patent application Ser. No. 17/032,931 filed Sep. 25, 2020 and issued as U.S. Pat. No. 11,194,273 on Dec. 7, 2021, which is a Continuation of U.S. patent application Ser. No. 16/226,429, filed Dec. 19, 2018 and issued as U.S. Pat. No. 10,824,100 on Nov. 3, 2020, which claims the benefit of Japanese Patent Application No. 2017-252542, filed Dec. 27, 2017, all of which are hereby incorporated by reference herein in their entirety.

BACKGROUND OF THE DISCLOSURE

Field of the Disclosure

The disclosure relates to a film heating fixing device mounted on an electrophotographic image forming apparatus.

Description of the Related Art

As a fixing device mounted on an electrophotographic image forming apparatus, a film heating fixing device is known. The film heating fixing device includes a cylindrical film, a nip portion forming member that is in contact with an inner surface of the film, and a roller that forms a nip portion with the nip portion forming member across the film. In this nip portion, the film heating fixing device heats a recording material that bears a toner image while nipping and conveying the recording material, thereby fixing the toner image to the recording material.

In this film heating fixing device, when the film is rotated, a so-called film shifting movement, in which the film moves in a rotational axis direction of the roller, can occur. To deal with this, a configuration is known in which, even if the film makes a shifting movement, a restriction member for receiving an edge surface in a lengthwise direction of the film to restrict the shifting movement of the film is provided (see Japanese Patent Application Laid-Open No. 4-044080).

SUMMARY OF THE DISCLOSURE

The disclosure is directed to providing a fixing device that can reduce the damage caused to a film due to a shifting movement of the film by designing a shape of a restriction member.

According to an aspect of the disclosure, a fixing device includes a cylindrical film, a nip portion forming member configured to be in contact with an inner surface of the film, a roller configured to form a nip portion with the nip portion forming member across the film, and a restriction member configured to restrict a shifting movement of the film in a rotational axis direction of the roller, the restriction member including a first surface that is opposed to an edge surface of the film and with which the edge surface comes into contact when the film makes the shifting movement, and a second surface opposed to an inner surface of the film and configured to guide rotation of the film, wherein a recording material on which an image is formed is heated while being conveyed in the nip portion, and the image is fixed to the recording material. As viewed in a conveying direction of the recording material, the first surface is inclined so that, as the first surface goes further away from the nip portion in a direction perpendicular to both the conveying direction and the rotational axis direction, the first surface inclines toward a direction coming closer to the edge surface of the film. As viewed in the perpendicular direction, the first surface is inclined so that, as the first surface comes downstream in the conveying direction, the first surface inclines toward a direction going further away from the edge surface of the film, and wherein as viewed in the conveying direction, the second surface is inclined so that, as the second surface comes closer to a center in the rotational axis direction of the film, the second surface inclines toward a direction coming closer to the roller. And as viewed in the perpendicular direction, the second surface is inclined so that, as the second surface comes closer to the center of the film, the second surface inclines toward a direction going downstream in the conveying direction.

Further features and aspects of the disclosure will become apparent from the following description of example embodiments with reference to the attached drawings.

DESCRIPTION OF THE EMBODIMENTS

1. Image Forming Apparatus

Figure 1:
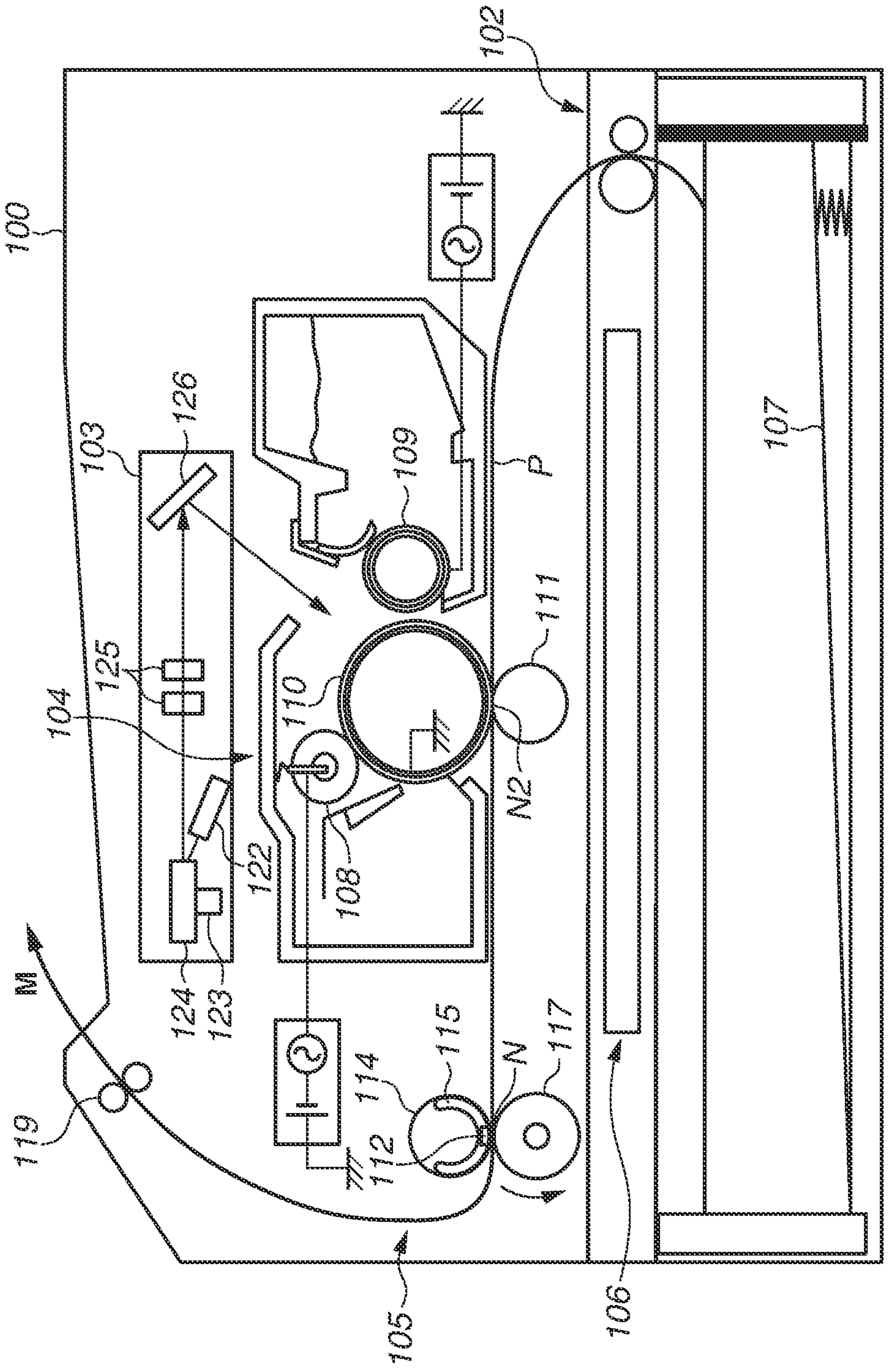
FIG. 1 is a cross-sectional view of an image forming apparatus on which a fixing device according to a first example embodiment is mounted.

FIG. 1 is a schematic cross-sectional view of an image forming apparatus on which a fixing device according to a first example embodiment is mounted. An image forming apparatus 100 includes a sheet feeding unit 102 that separates stacked recording materials P one by one and conveys each of the recording materials P, and a laser scanner unit 103 that irradiates an image forming unit 104 with laser light modulated based on image data provided by an external apparatus. The image forming apparatus 100 further includes the image forming unit 104, a fixing device 105 that fixes a toner image formed on the recording material P to the recording material P by supplying heat and applying pressure, and a control device 106 that controls sequences of the units and devices described above.

The laser scanner unit 103 includes a laser unit 122 that emits laser light based on image data provided by an external apparatus. The laser scanner unit 103 further includes a polygon mirror 124 used in a scan with the laser light from the laser unit 122, a motor 123 that rotates the polygon mirror 124, an image-forming lens group 125, and a reflecting mirror 126.

Other members will be described below in "3. Image Forming Operation".

2. Fixing Device

The fixing device 105 according to the present example embodiment is a film heating fixing device directed to shortening the start-up time and achieving low power consumption as described above.

Figure 2A:
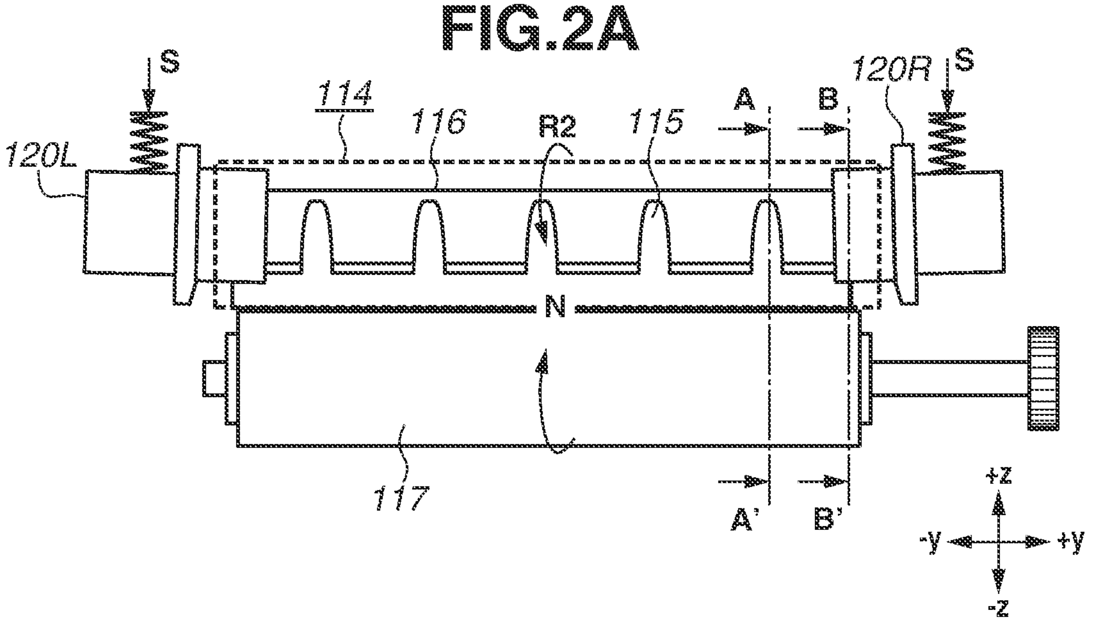
FIG. 2A is a diagram illustrating the fixing device according to the first example embodiment as viewed in a conveying direction of a recording material.
Figure 2B:
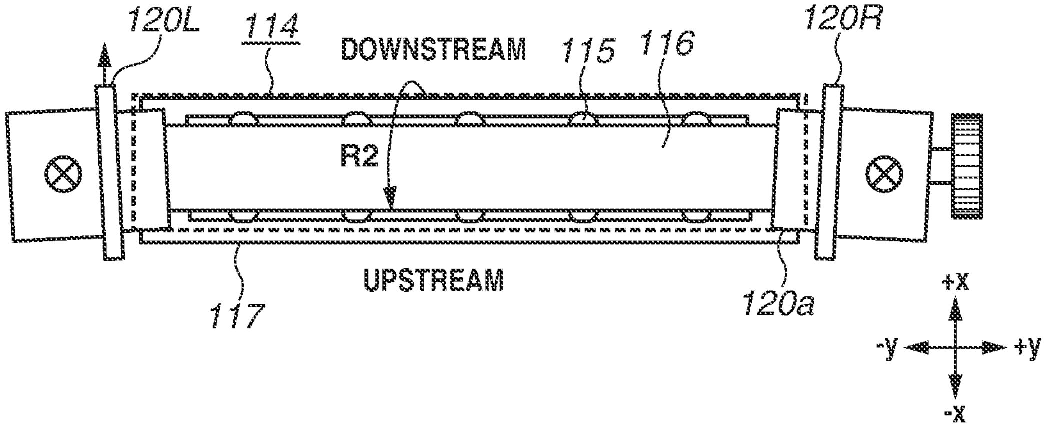
FIG. 2B is a diagram illustrating the fixing device as viewed in a direction perpendicular to both the conveying direction of the recording material and a rotational axis direction of a pressure roller.
Figure 2C:
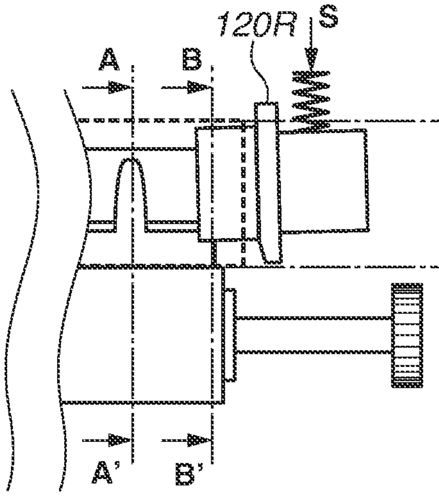
FIG. 2C is a partial view of FIG. 2A.
Figure 2D:
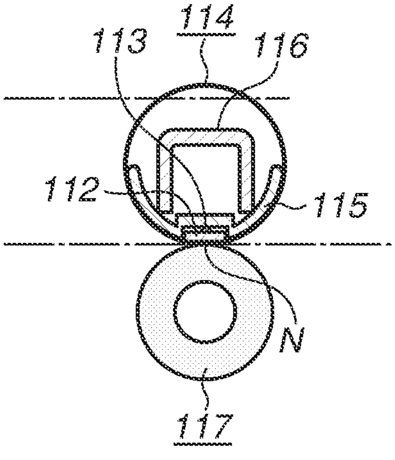
FIGS. 2D and 2E are cross-sectional views of FIG. 2C.
Figure 2E:
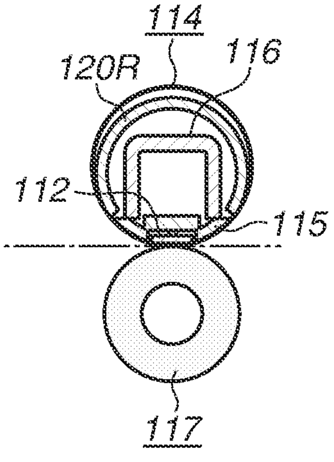

FIG. 2A is a diagram illustrating the fixing device 105 according to the present example embodiment as viewed in the conveying direction of a recording material (+x direction). FIG. 2B is a diagram illustrating the fixing device 105 as viewed in a −z direction. Further, FIGS. 2D and 2E illustrate cross-sectional views taken along A-A' and B-B', respectively, in FIG. 2C. In FIGS. 2A, 2B, and 2C, a fixing film 114 is indicated by a dotted line so that a state inside the fixing device 105 can be seen-through.

As illustrated in FIG. 2D, the fixing device 105 includes the cylindrical film 114, a heater 112 as a nip portion forming member that is in contact with an inner surface of the film 114, and a pressure roller 117 that forms a nip portion with the heater 112 via the film 114. The film 114 and the heater 112 are members that are long in the rotational axis direction of the pressure roller 117 (y-axis direction). The fixing device 105 further includes a supporting member 115 that is formed of a heat-resistant resin and supports the heater 112 from a surface of the heater 112 opposite to a surface of the heater 112 that is in contact with the film 114, and a metal stay 116 that reinforces the supporting member 115 to increase bending rigidity of the supporting member 115. The lengthwise direction of the stay 116 is parallel to the rotational axis direction of the pressure roller 117 (y-axis direction). As illustrated in FIG. 2A, flanges 120L and 120R are fitted onto left and right end portions, respectively, of the fixing film 114.

Figure 3:
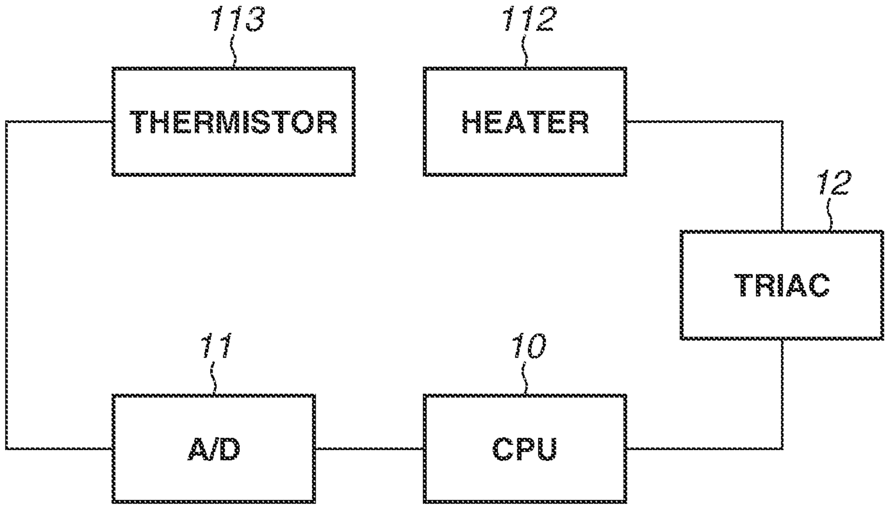
FIG. 3 is a block diagram illustrating a temperature control system of the image forming apparatus according to the first example embodiment.

The plate-like heater 112 as the nip portion forming member includes a substrate, an electrical resistive layer formed on the substrate, and an insulating protection layer for protecting the electrical resistive layer. The substrate is a ceramic member having good heat conductivity, high heat resistance, and insulation properties, such as alumina or aluminum nitride. The heat generating resistive layer is formed to have a thickness of about 10 μm and a width of 1 to 3 mm on a surface of the substrate by screen printing. As a material of the heat generating resistive layer, silver-palladium (Ag/Pd) is used. The protection layer is a layer formed of glass or a fluororesin on the heat generating resistive layer. On a back surface of the heater 112, a thermistor 113 serving as a temperature detection unit is placed. As illustrated in FIG. 3, the thermistor 113 is connected to a central processing unit (CPU) 10 as a temperature control unit via an analog-to-digital (A/D) converter 11.

Figure 4A:
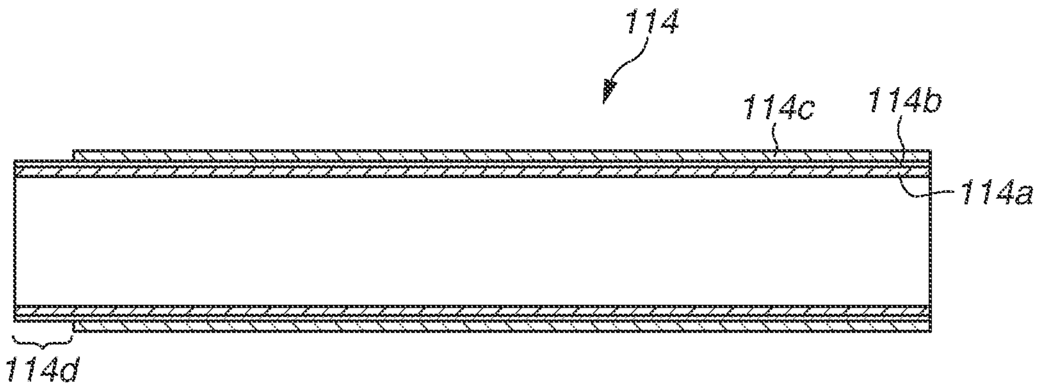
FIG. 4A is a lengthwise cross-sectional view of a fixing film according to the first example embodiment.

The fixing film 114 has an inner perimeter which is slack relative to outer peripheries of the heater 112 and the supporting member 115, and the fixing film 114 is externally fitted onto the heater 112 and the supporting member 115. Thus, the fixing film 114 rotates while being guided by the heater 112 and the supporting member 115. As illustrated in FIG. 4A, the fixing film 114 includes a base 114*a* formed of a polyimide resin and having a thickness of 20 to 100 μm, and a conductive primer layer 114*b* provided on the base 114*a*. The fixing film 114 further includes a release layer 114*c* formed of a fluororesin such as tetrafluoroethylene-perfluoroalkyl vinyl ether copolymer (PFA), polytetrafluoroethylene (PTFE), and tetrafluoroethylene-hexafluoropropylene copolymer (FEP) and formed on the conductive primer layer 114*b*.

Figure 4B:
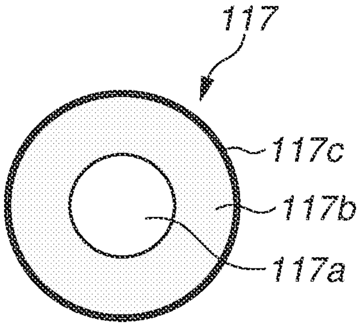
FIG. 4B is a cross-sectional view of the pressure roller according to the first example embodiment.

As illustrated in FIG. 4B, the pressure roller 117 includes a metal core 117*a*, a heat-resistant elastic layer 117*b* provided around the metal core 117*a*, and a release layer 117*c* formed on the elastic layer 117*b*. The metal core 117*a* has a diameter of 8.5 mm and is made of a metal such as Steel Use Stainless (SUS). The elastic layer 117*b* is an elastic body formed of a heat-resistant rubber such as a silicone rubber and a fluoro-rubber having insulation properties or formed by foaming the heat-resistant rubber. On an outer periphery of the elastic layer 117*b*, the release layer 117*c* formed of a fluororesin such as PFA, PTFE, and FEP is formed. In the present example embodiment, the pressure roller 117 having an outer diameter of 14.0 mm and a hardness of 40° (load of 600 g by Asker C) is used. The pressure roller 117 is rotatably supported by a bearing (not illustrated).

Figure 4C:
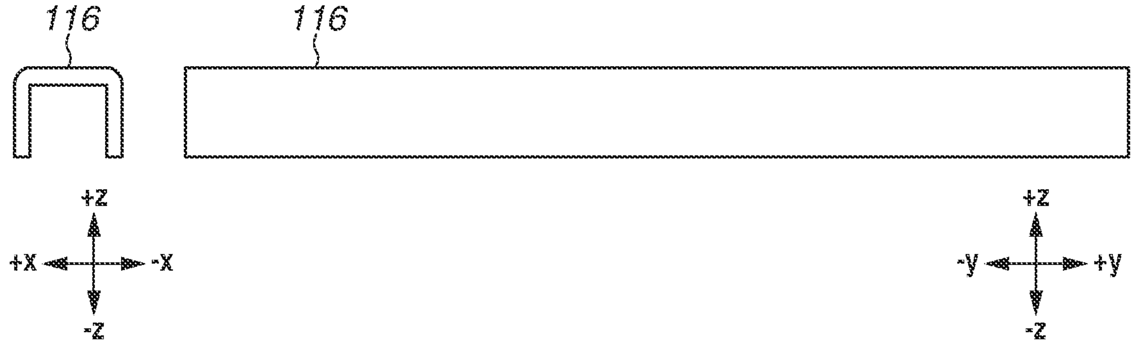
FIG. 4C is a cross-sectional view and a side view of a stay according to the first example embodiment.

As illustrated in FIG. 4C, the stay 116 as a reinforcing member has a cross section perpendicular to the y-axis direction that is formed into a U-shape. As viewed in the y-axis direction, a U-shape opening portion of the stay 116 is provided in an orientation facing the heater 112. As illustrated in FIGS. 2C, 2D, and 2E, the stay 116 receives a pressing force S from pressure springs held by the fixing device 105 via the flanges 120L and 120R, and transmits the pressing force S to the supporting member 115 and the heater 112. Consequently, the fixing film 114 externally fitted onto the supporting member 115 and the heater 112 is biased toward the pressure roller 117, and thereby forming a fixing nip portion N.

The supporting member 115 is a member that supports the heater 112 from the surface of the heater 112 opposite to the surface thereof that is in contact with the fixing film 114. The supporting member 115 biases the heater 112 toward the pressure roller 117 via the stay 116. Accordingly, the fixing nip portion N that is uniformly contacted in a lengthwise direction (y-axis direction) thereof is formed between the fixing film 114 and the pressure roller 117. The fixing film 114 is externally fitted onto the heater 112 and the supporting member 115. The supporting member 115 is reinforced by the stay 116.

The stay 116 receives the pressing force S at both end portions in the y-axis direction thereof. As a result, there is a case where the stay 116 bends, whereby the nip portion N does not have a uniform pressing force in the y-axis direction thereof.

Accordingly, a thickness of the supporting member 115 may be slightly increased in a center portion in the y-axis direction thereof, thereby compensating for deformation due to bending caused to the stay 116 so that the fixing nip portion N has a uniform pressing force distribution in the lengthwise direction (y-axis direction) thereof.

As illustrated in FIGS. 2A and 2B, the flanges 120L and 120R are provided at positions facing edge surfaces of both edge portions of the fixing film 114. The flanges 120L and 120R have approximately symmetrical shapes. Thus, only the flange 120R is described below.

Figure 5A:
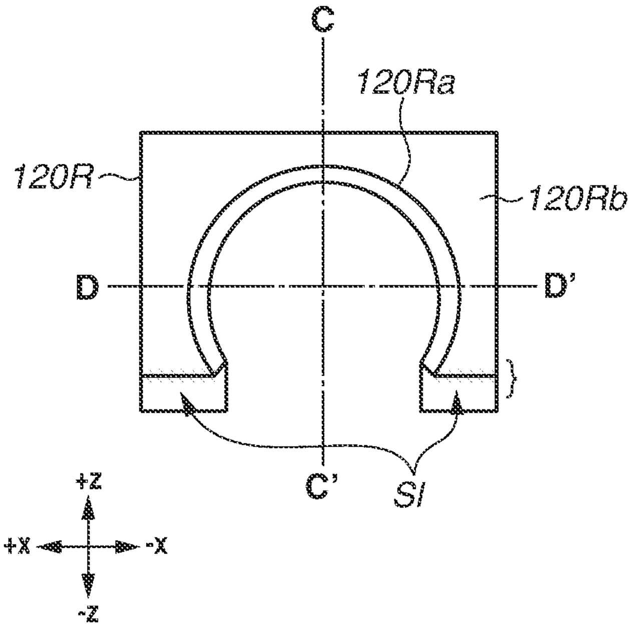
FIGS. 5A, 5B, and 5C are a front view, a side view, and a front view, respectively, of a flange according to the first example embodiment.
Figure 5B:
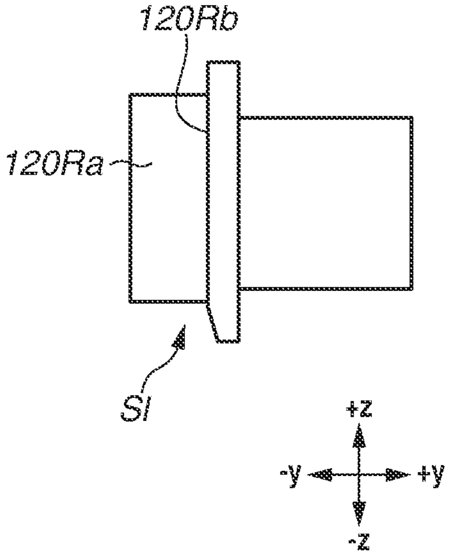
Figure 5C:
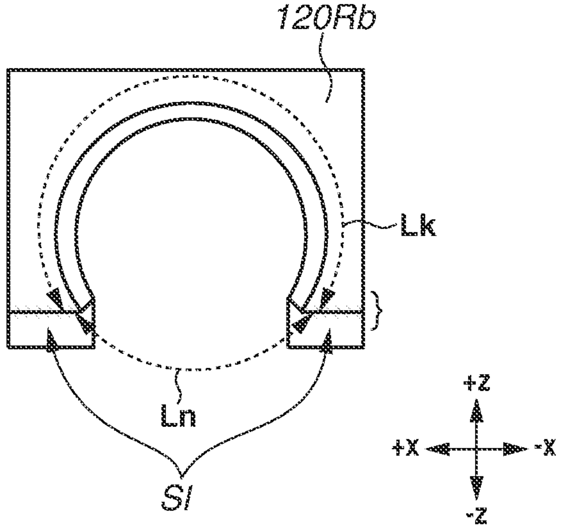

FIGS. 5A to 5C are diagrams illustrating the shape of the flange 120R. FIG. 5A is a diagram illustrating the flange 120R as viewed in the y-axis direction. FIG. 5B is a side view of the flange 120R as viewed in the +x direction.

The flange 120R includes a guide surface 120Ra (second surface) that guides the inner peripheral surface of the fixing film 114, and a restriction surface 120Rb (first surface) that restricts movement of the fixing film 114 in a case where the fixing film 114 moves in the lengthwise direction thereof. The guide surface 120Ra extends in a direction toward the center of the fixing film 114 in the lengthwise direction thereof.

FIG. 5C is a diagram illustrating an area where the restriction surface 120Rb is formed. In a case where the flange 120R is viewed in the y-axis direction, an area Lk is an area where the restriction surface 120Rb is formed, and an area Ln is an area where the restriction surface 120Rb is not formed. In the area Ln, an area adjacent to the area Lk is Sl that is provided at a position further away from the edge surface of the fixing film 114 than the restriction surface 120Rb in the y-axis direction. As illustrated in FIG. 5B, the area Sl of the flange 120R is a slope-shaped portion. The slope-shaped portion Sl has a slope that comes closer to the restriction surface 120Rb in the y-axis direction as the portion Sl goes further away from the fixing nip portion N in the rotational direction of the fixing film 114.

The guide surface 120Ra is formed to be perpendicular to the restriction surface 120Rb in any area thereof. This is to reduce stress applied to the fixing film 114 as much as possible within a range where the fixing film 114 that is loosely fitted is movable.

Figure 18A:
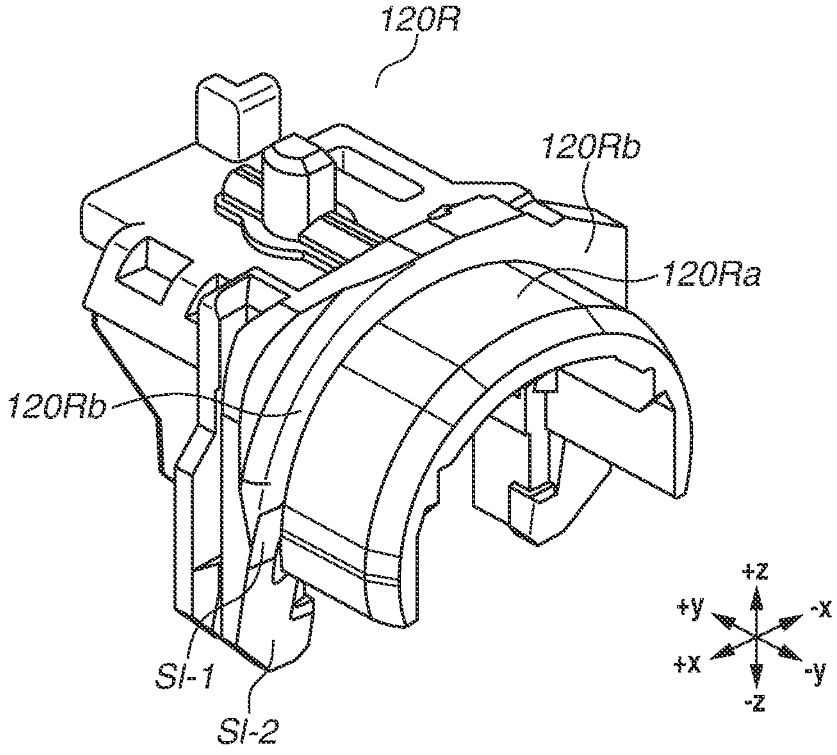
FIGS. 18A and 18B are perspective views of the flange according to the first example embodiment.
Figure 18B:
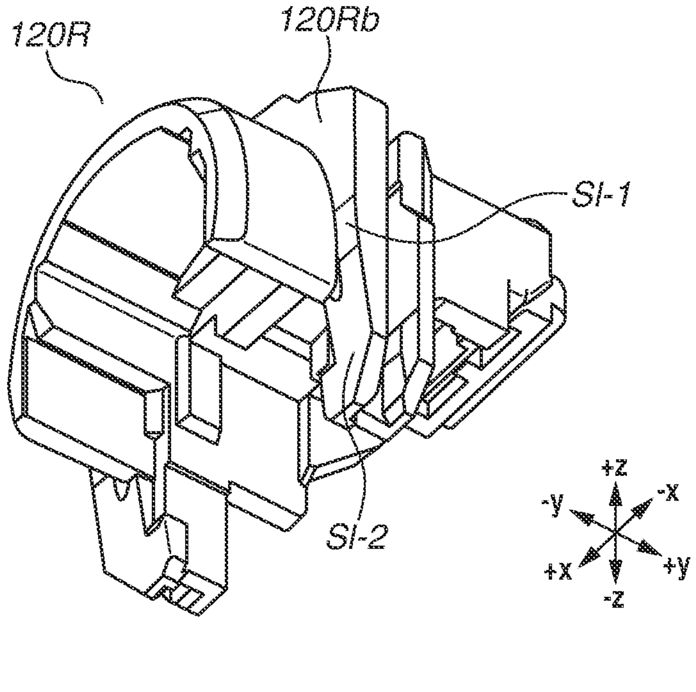

FIGS. 18A and 18B illustrate perspective views of the flange 120R viewed from different angles. The slope-shaped portion Sl includes a first slope-shaped portion Sl-1 on a side adjacent to the restriction surface 120Rb, and a second slope-shaped portion Sl-2 adjacent to the first slope-shaped portion Sl-1. The second slope-shaped portion Sl-2 is a flat surface, whereas the first slope-shaped portion Sl-1 is a curved surface. The first slope-shaped portion Sl-1 is formed as a curved surface to smoothly connect the second slope-shaped portion Sl-2 with the restriction surface 120Rb.

Figure 6A:
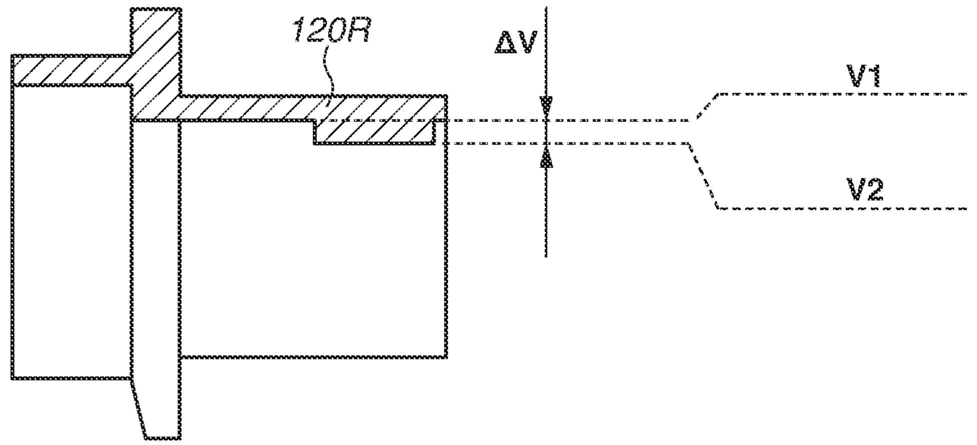
FIG. 6A is a cross-sectional view of the flange according to the first example embodiment taken along a plane C-C' of FIG. 5A.

FIG. 6A is a cross-sectional view of the flange 120R taken along C-C' in FIG. 5A. In the flange 120R according to the present example embodiment, as illustrated in FIG. 6A, a level difference ΔV is provided between fitting surfaces V1 and V2, which are fitting portions into which the stay 116 is fitted. In the present example embodiment, the level difference ΔV is 100 μm.

Figure 6B:
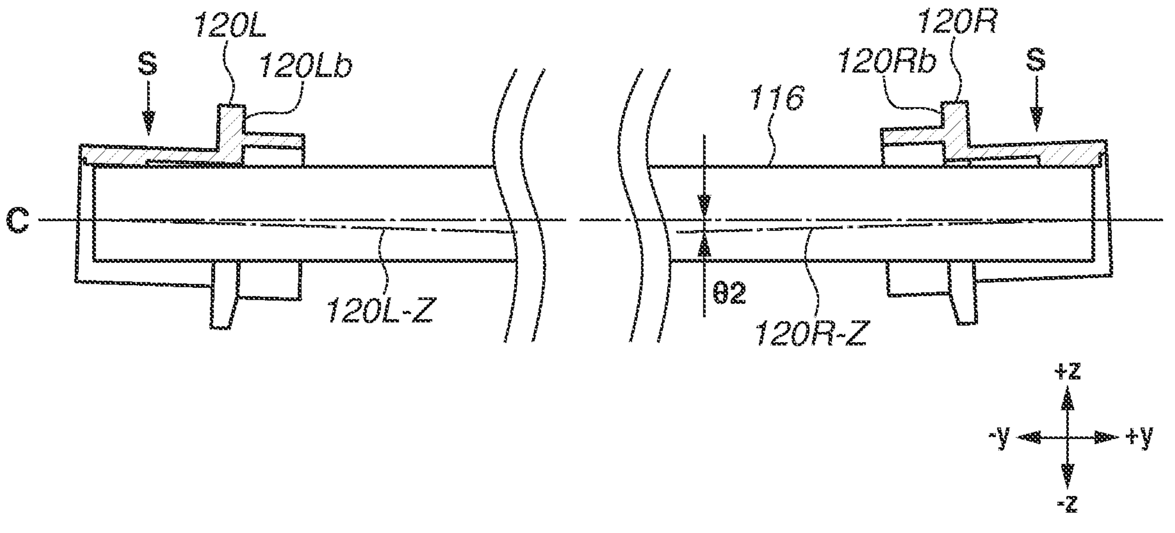
FIG. 6B is a diagram illustrating a fitting state between the flange and the stay in a cross section taken along the plane C-C' of FIG. 5A.

FIG. 6B illustrates a state where the flange 120L is fitted onto the stay 116. A center line C of the stay 116 is parallel to the lengthwise direction of the stay 116 and the rotational axis direction of the pressure roller 117. In this state, if a force is applied in a direction (S direction) perpendicular to the center line C of the stay 116, the result is as follows. As illustrated in FIG. 6B, due to the level difference ΔV, a perpendicular line 120R-Z of the restriction surface 120Rb (extending direction of the guide surface 120Ra of the flange 120R) is tilted relative to the lengthwise direction of the stay 116. As illustrated in FIG. 6B, as viewed in the conveying direction of the recording material, the restriction surface 120Rb is tilted so that the perpendicular line 120R-Z of the restriction surface 120Rb is tilted relative to the stay center line C. In other words, the restriction surface 120Rb is inclined so that, as the surface 120Rb goes further away from the fixing nip portion N in a direction (z-axis direction) perpendicular to the fixing nip portion N, the surface 120Rb inclines toward a direction coming closer to the end surface of the fixing film 114.

The downward direction in FIG. 6B is a direction toward the pressure roller 117 or the fixing nip portion N. In the present example embodiment, an angle θ2 between the center line C of the stay 116 and the perpendicular line 120R-Z is 0.8 degrees. The desirable range of the angle θ2 is 0.3 degrees or more to 1.5 degrees or less. Since the guide surface 120Ra is perpendicular to the restriction surface 120Rb, an angle between the extending direction of the guide surface 120Ra (generatrix direction of the guide surface 120Ra) and the stay center line C is also 0.8 degrees. The desirable range of this angle is 0.3 degrees or more to 1.5 degrees or less.

The flange 120L on the left side is also tilted relative to the stay 116 in a similar configuration. If the flanges 120R and 120L are fitted onto the same stay 116 and held by the force S, as illustrated in FIG. 6B, the restriction surfaces 120Rb and 120Lb of the flanges 120R and 120L, respectively, face each other. The restriction surfaces 120Rb and 120Lb are tilted so that the perpendicular lines 120R-Z and 120L-Z of the restriction surfaces 120Rb and 120Lb, respectively, extend further downward in FIG. 6B as they come closer to the center of the stay 116 in the extending direction of the stay center line C.

The fixing device 105 according to the present example embodiment illustrated in FIG. 2A is configured as described above. There is a case where the force S is applied to the flange 120R(L), the stay 116 slightly bends, and the tilt of the flange 120R(L) changes. Even in such a case, each of the perpendicular lines 120R-Z and 120L-Z of the restriction surfaces 120Rb and 120Lb, respectively, is set to an angle at which the perpendicular lines extend downward in FIG. 6B as described above. In such a configuration, the tilts of the left and right flanges can be determined based on the stay center line C. Thus, a variation between the left and right flanges is small, and the flanges can be positioned with high accuracy.

Figure 7A:
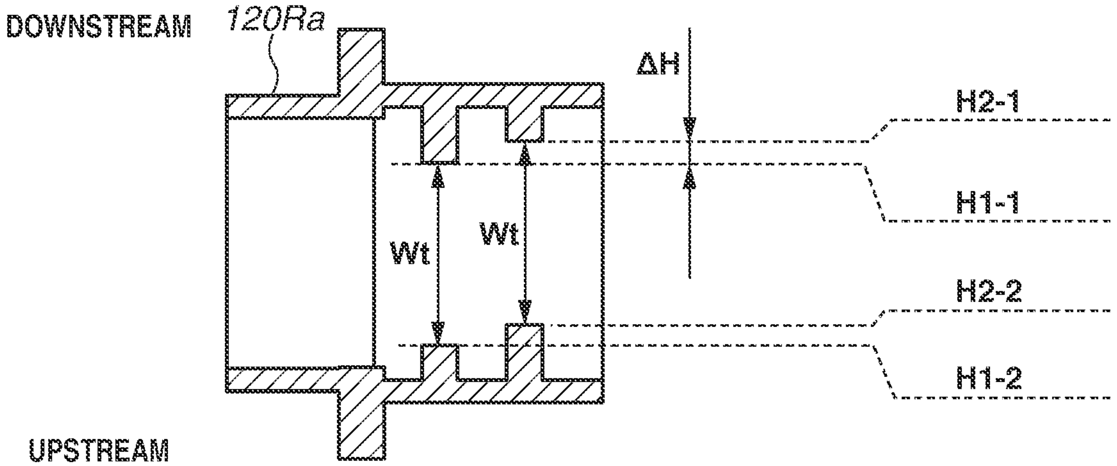
FIG. 7A is a cross-sectional view of the flange according to the first example embodiment taken along a plane D-D'.
Figure 7B:
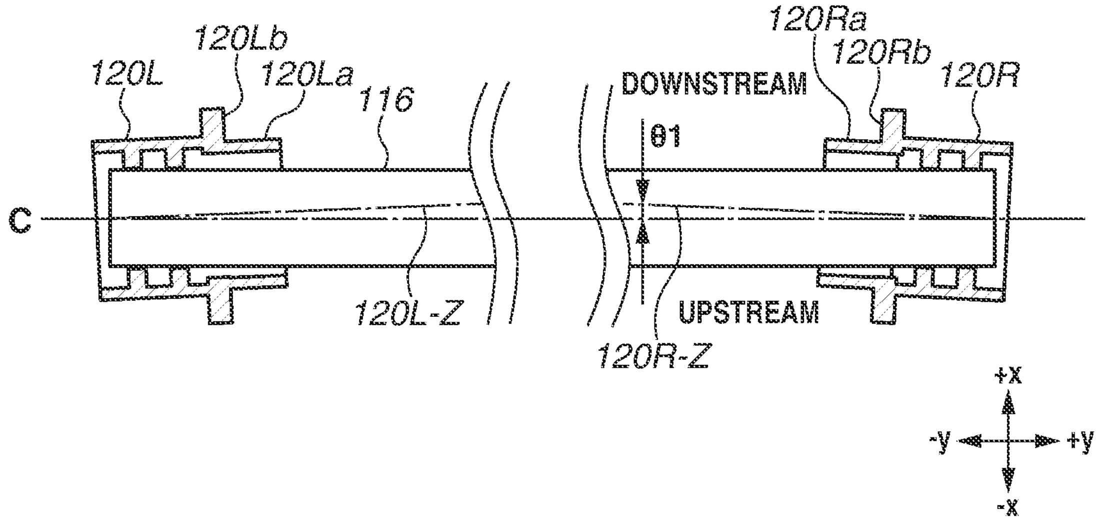
FIG. 7B is a diagram illustrating a fitting state between the flange and the stay in a cross section taken along the plane D-D'.

FIG. 7A is a cross-sectional view of the flange 120R taken along D-D' illustrated in FIG. 5A. As illustrated in FIGS. 7A and 7B, in the flange 120R, there are formed four surfaces that come into contact with the stay 116. Each of a distance between fitting surfaces H1-1 and H1-2 and a distance between fitting surfaces H2-1 and H2-2 almost matches a width of the stay 116 in the conveying direction of the recording material. The width of the stay 116 is set to a width Wt so that the flange 120R fits onto the stay 116. The fitting surface H2-1 for the stay 116 is set to be positioned downstream in the conveying direction of the recording material by a level difference ΔH from the position of the fitting surface H1-1. The fitting surface H2-1 is set to fit the stay 116 more on an edge surface side thereof compared with the fitting surface H1-1 in the lengthwise direction of the stay 116. In the present example embodiment, the level difference ΔH is 100 μm. Taking into account that an amount of bending of the stay 116 is likely to be greater on the outer side, the distance between the fitting surfaces H2-1 and H2-2 may be greater than the distance between the fitting surfaces H1-1 and H1-2.

FIG. 7B is a cross-sectional view of the flanges 120R and 120L and the stay 116 in a direction (z-axis direction) perpendicular to both the extending direction of the stay center line C and the conveying direction of the recording material, and illustrates a state where the flange 120R is fitted onto the stay 116. If the flange 120R is fitted onto the stay 116, then due to the level difference ΔH between the fitting surfaces H1-1 and H2-1, the result is as follows. The restriction surface 120Rb is tilted so that the perpendicular line 120R-Z of the restriction surface 120Rb of the flange 120R is inclined further downstream in the conveying direction of the recording material (+x-direction) as it comes closer to the lengthwise center of the stay 116 in the extending direction of the stay center line C. In other words, the restriction surface 120Rb is inclined toward a direction going further away from the edge surface of the fixing film 114 as it is on a further downstream side in the conveying direction of the recording material. In the present example embodiment, an angle θ1 between the stay center line C and the perpendicular line 120R-Z is 1.2 degrees. It is desirable that the angle θ1 be 0.5 degrees or more and 3 degrees or less. Since the guide surface 120Ra is perpendicular to the restriction surface 120Rb, an angle between the extending direction of the guide surface 120Ra (generatrix direction of the guide surface 120Ra) and the stay center line C is also 1.2 degrees. The desirable range of this angle is 0.5 degrees or more to 3.0 degrees or less. The flange 120L has a similar configuration. In the present example embodiment, the angle θ1 is greater than the angle θ2.

If the flanges 120R and 120L are fitted onto the same stay 116, as illustrated in FIG. 7B, the restriction surfaces 120Rb and 120Lb of the flanges 120R and 120L, respectively, face each other. The restriction surfaces 120Rb and 120Lb are inclined so that the perpendicular lines 120R-Z and 120L-Z of the restriction surfaces 120Rb and 120Lb, respectively, are directed further downstream in the conveying direction of the recording material as it comes closer to the lengthwise center of the stay 116 in the extending direction of the stay center line C.

3. Image Forming Operation

The image forming apparatus 100 forms an image by the following procedure. If an external apparatus transfers image information to the image forming apparatus 100, then in the sheet feeding unit 102 of the image forming apparatus 100 illustrated in FIG. 1, the recording materials P are separated one by one and taken out of the sheet feeding tray 107. Each of the recording materials P taken out of the sheet feeding tray 107 is conveyed to the image forming unit 104 by an abutment portion (conveying nip portion) between a conveyance roller and a conveyance idle roller installed opposing the conveyance roller. A photosensitive drum 110 axially supported to be rotatable in the image forming unit 104 is uniformly charged by a charging roller 108 that is also rotatable. Further, on the photosensitive drum 110, a latent image is formed by laser light emitted from the laser scanner unit 103 based on the image information. When the photosensitive drum 110 passes through a position where the photosensitive drum 110 faces a developing sleeve 109 that bears toner, the toner is applied to a charged area on the surface of the photosensitive drum 110 by a bias applied between the photosensitive drum 110 and the developing sleeve 109, thereby forming a toner image.

When the toner image formed in the charged area on the surface of the photosensitive drum 110 passes through a transfer nip portion N2 between the photosensitive drum 110 and a transfer roller 111, the toner image is transferred onto the recording material P by a transfer bias applied between the photosensitive drum 110 and the transfer roller 111. The toner image borne on the recording material P becomes a fixed image when heat is supplied and pressure is applied to the fixing device 105. Then, the recording material P is sent to sheet discharge rollers 119 by a conveying force of the fixing device 105, and is discharged to a sheet discharge unit of the image forming apparatus 100 by the sheet discharge rollers 119 (direction of an arrow M in FIG. 1). Thus, a series of image forming processes ends.

A fixing process by the fixing device 105 is performed as follows. A driving gear G provided to an end portion of the metal core 117*a* of the pressure roller 117 is driven to rotate by a motor (not illustrated), whereby the pressure roller 117 rotates in a direction of an arrow. By the rotation of the pressure roller 117, a frictional force between an outer peripheral surface of the pressure roller 117 and an outer peripheral surface of the release layer 114*c* of the fixing film 114 (hereinafter referred to as "the surface of the film 114") causes a rotational force to act on the fixing film 114 in the fixing nip portion N. By the rotation of the pressure roller 117, the fixing film 114 rotates in a direction of an arrow around an outside of the supporting member 115 while the inner surface of the fixing film 114 slides in contact with the heater 112.

Between the fixing film 114 and the heater 112 and between the fixing film 114 and the supporting member 115, a heat-resistant grease is applied. As the heat-resistant grease, a fluorine grease composed of perfluoropolyether as a base oil and PTFE as a thickener is used.

The CPU 10 illustrated in FIG. 3 turns on a triode for alternating current (TRIAC) 12. Consequently, a current is applied to an electrical resistive layer formed on the surface of the heater 112, the heater 112 generates heat, and a temperature of the heater 112 rises. The temperature of the heater 112 is transmitted as an output signal (temperature detection signal) of the thermistor 113, which is provided on a back surface of the heater 112, to the CPU 10 via the A/D converter 11. Based on the temperature detection signal, the CPU 10 controls power to be applied to the heater 112 by phase control or wavenumber control using the TRIAC 12, thereby controlling the power of the heater 112. The CPU 10 controls the TRIAC 12 to raise the temperature of the heater 112 in a case where the temperature of the heater 112 is lower than a predetermined setting temperature (target temperature) and to lower the temperature of the heater 112 in a case where the temperature of the heater 112 is higher than the setting temperature, thereby maintaining the heater 112 at the setting temperature.

In a state where the temperature of the heater 112 rises to the setting temperature and the rotational speed of the film 114 by the rotation of the pressure roller 117 is steady, a recording material P that bears an unfixed toner image T is introduced into the fixing nip portion N. The recording material P is nipped between the fixing film 114 and the pressure roller 117 in the fixing nip portion N and is conveyed. In the process of conveying the recording material P, heat of the heater 112 is applied to the unfixed toner image T on the recording material P across the fixing film 114, and pressure is applied to the unfixed toner image T by the nip portion N, whereby the unfixed toner image T is heated and fixed to the surface of the recording material P.

4. Orientation and Shifting Force Generation State of Fixing Film

Figure 16:
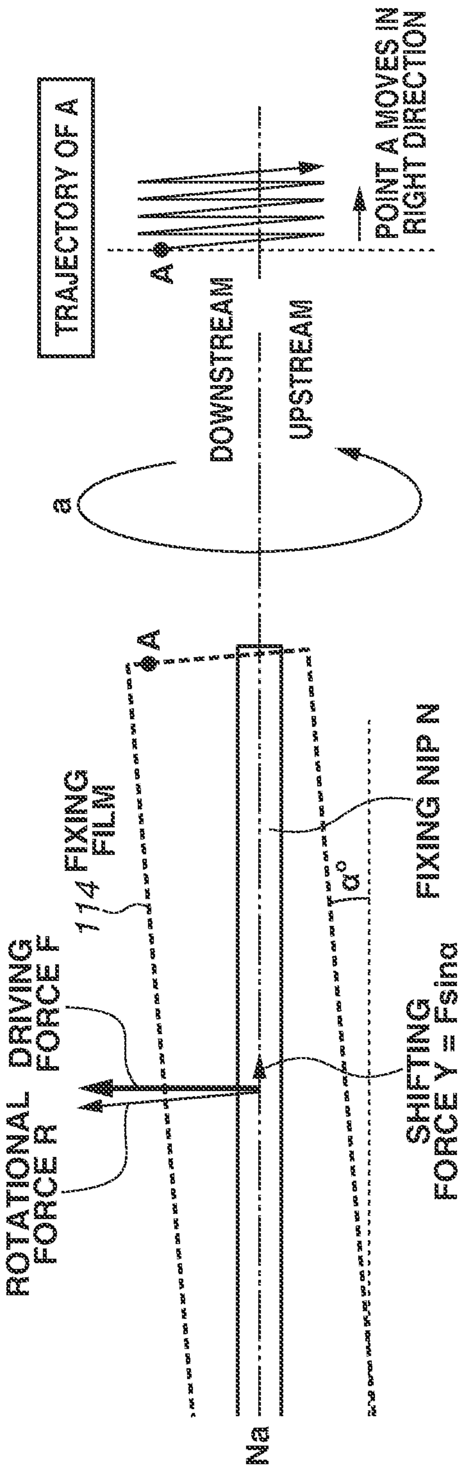
FIG. 16 is a diagram illustrating a mechanism in which a shifting movement of a fixing film occurs.
Figure 17:
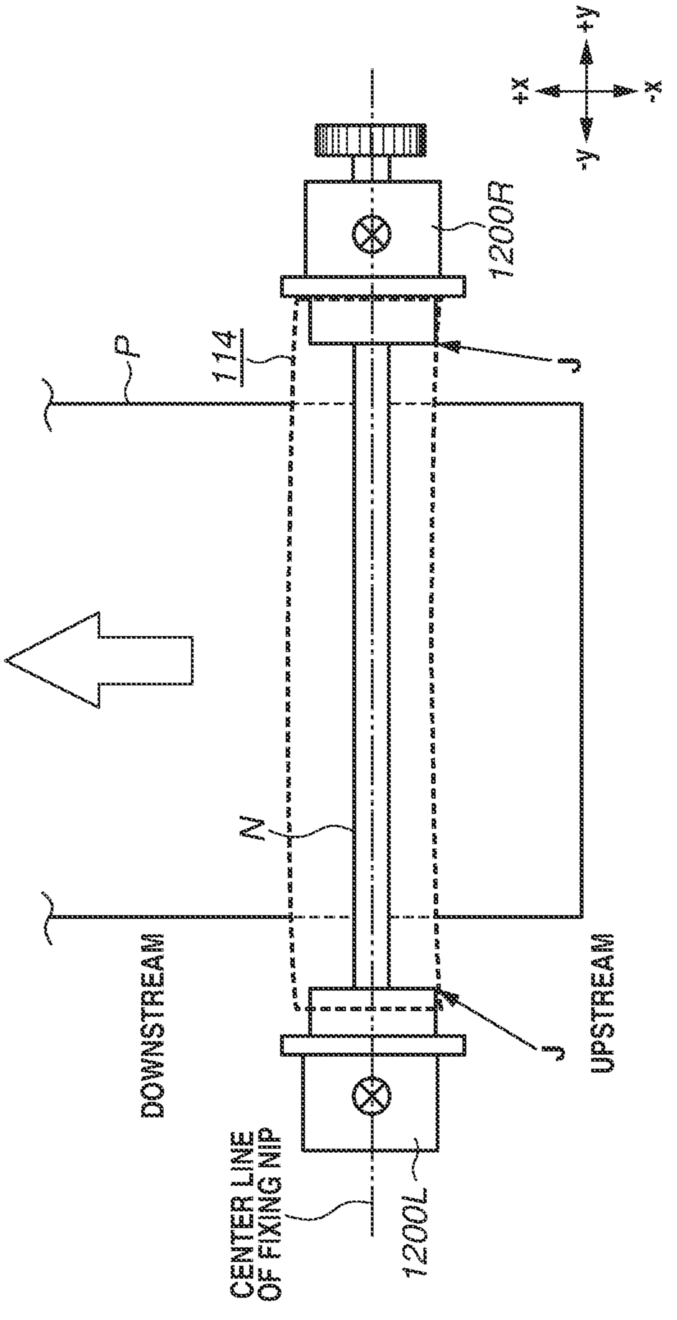
FIG. 17 is a diagram illustrating a mechanism in which a fixing film is damaged.

A generation mechanism of a shifting force of the fixing film is described using a fixing device according to a comparative example. FIG. 17 is a diagram illustrating a fixing device as a comparative example. FIG. 16 is a diagram illustrating a shifting motion of the fixing film 114.

The fixing device according to the comparative example and the fixing device 105 according to the present example embodiment are different only in attachment angles of flanges 1200L and 1200R. In the flange 1200R according to the comparative example, a restriction surface 1200Rb is a flat surface perpendicular to the rotational axis direction (y-axis direction) of the pressure roller 117. The flange 1200R is provided to the stay 116 (not illustrated) so that a guide surface 1200Ra extends in a direction parallel to the rotational axis direction of the pressure roller 117.

Similarly to the present example embodiment, the fixing film 114 of the fixing device according to the comparative example is stretched loosely around the supporting member 115 and rotates in a direction of an arrow a by the rotation of the pressure roller 117. In the state of FIG. 16, if a driving force F is applied to the fixing film 114 in the fixing nip portion N, a rotational force R and a shifting force Y in the rotational axis direction of the fixing film 114 act on the film 114. In a case where a tilt in the lengthwise direction of the fixing film 114 relative to the rotational axis direction of the pressure roller 117 is $\alpha°$, the shifting force Y of the film 114 can be represented as F sin a. If the shifting force Y acts on the fixing film 114 due to the rotation of the fixing film 114, any point A on the edge surface of the fixing film 114 moves in the rotational axis direction of the fixing film 114 while drawing a trajectory as illustrated in "TRAJECTORY OF A" on the right side in FIG. 16. A force that moves the film 114 in the rotational axis direction of the fixing film 114 is a shifting force of the film 114.

As described above, the shifting force is caused by the tilt of the fixing film 114. However, to achieve smooth rotation, the fixing film 114 needs to be stretched somewhat loosely around the supporting member 115. Further, the tilt of the fixing film 114 may also be caused through insufficient accuracy of a component or alignment performed when the fixing film 114 is assembled. Thus, it is difficult to completely eliminate the tilt of the fixing film 114.

As another case where the fixing film 114 may be damaged is a case where a strong stress from the flange 1200R acts on the inner peripheral surface of the fixing film 114. For example, while a recording material is being conveyed to the fixing device, a jam can occur due to an emergency stop caused by a user or a power failure. At this time, if the user clears the jam of the recording material from the fixing device, the fixing film 114 can be deformed in the lengthwise direction thereof. If the user clears the jam by pulling out the recording material toward the downstream side in the conveying direction of the recording material (direction of an arrow in FIG. 17), the fixing film 114 is dragged by the recording material and deformed into an arch shape toward the downstream side in the conveying direction of the recording material. Accordingly, an extremity portion (portion indicated by an arrow J in FIG. 17) of the guide surface 1200Ra of the flange 1200R comes into contact locally under a large contact pressure with the inner peripheral surface of the fixing film 114 on the upstream side in the conveying direction of the recording material. This middle portion of the fixing film 114 is weak and is likely to be wrinkled or folded even if a stress is not so large, so that it is probable that the fixing film 114 is broken. Due to the above described mechanism, there is a case where the fixing film 114 is shifted and is damaged.

Figure 8A:
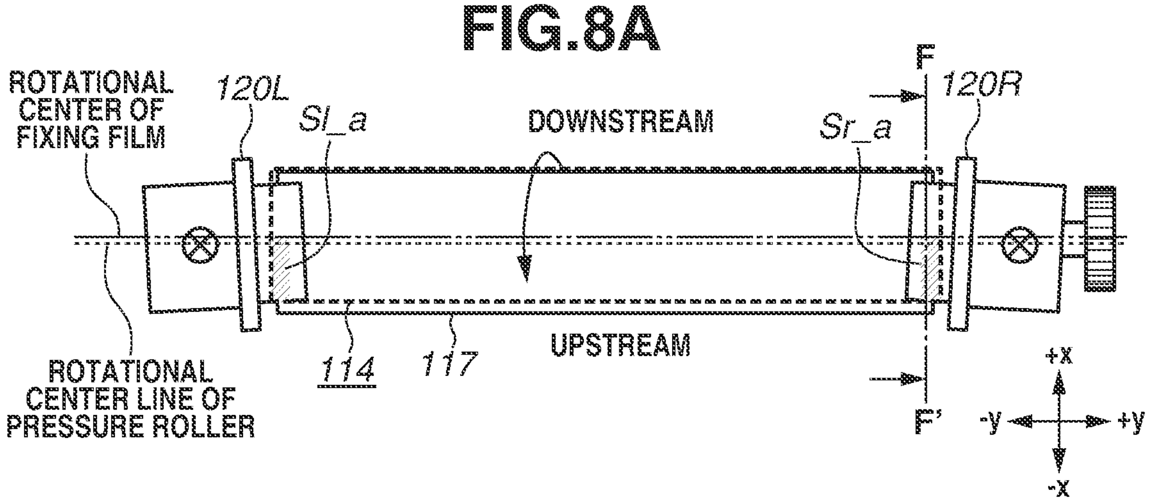
FIGS. 8A, 8B, and 8C are diagrams illustrating patterns of a tilt of a lengthwise direction of the fixing film according to the first example embodiment relative to the rotational axis direction of the pressure roller.
Figure 8B:
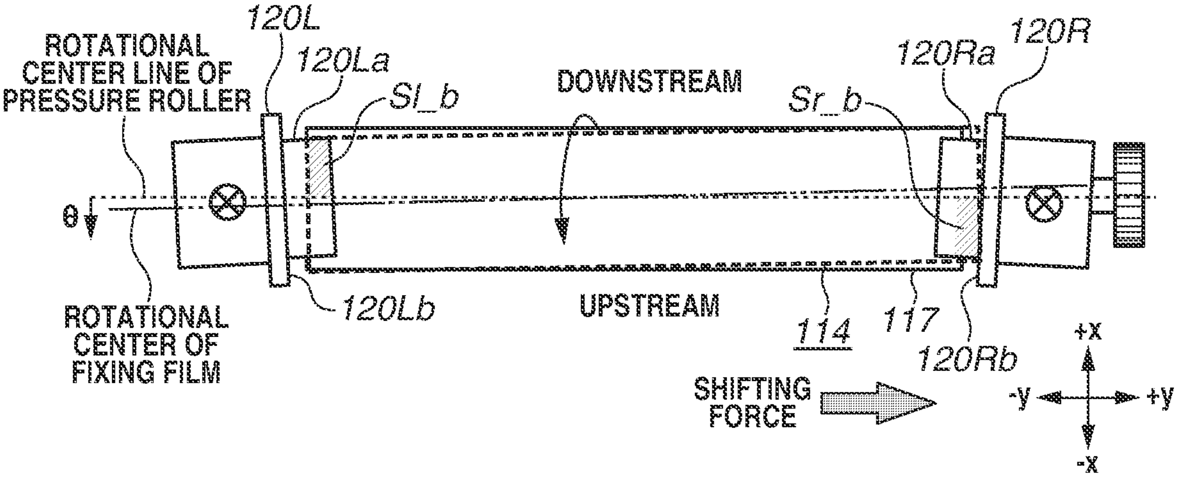
Figure 8C:
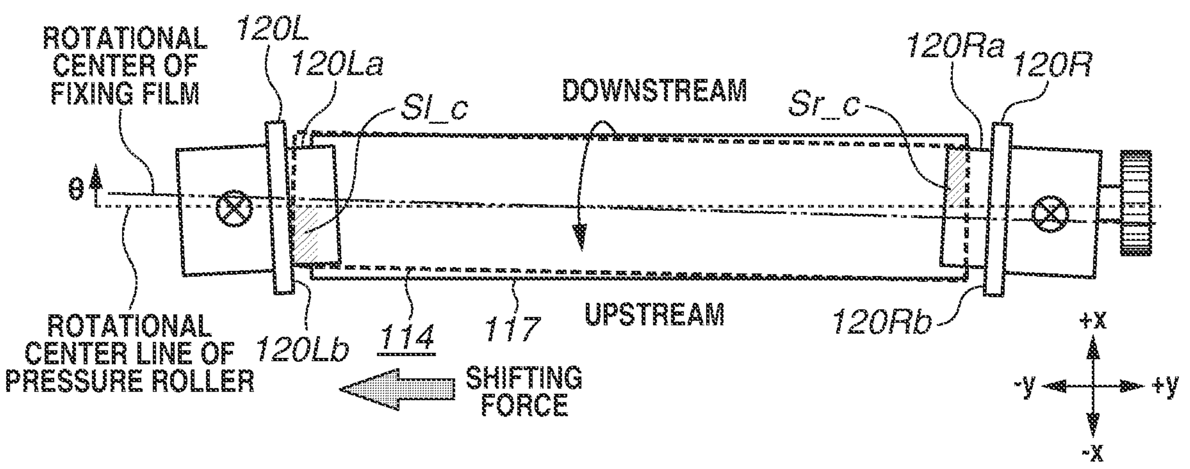

FIGS. 8A to 8C illustrate the tilt of the fixing film 114 relative to the rotational center line of the pressure roller 117 in the fixing device 105 according to the present example embodiment, and a generation state of the shifting force of the fixing film 114. To simplify FIGS. 8A to 8C, the stay 116 and the supporting member 115 are not illustrated.

The fixing film 114 can take any of the following three orientations:

(1) an orientation where the lengthwise direction (generatrix direction) of the fixing film 114 is parallel to the rotational center line of the pressure roller 117 (FIG. 8A);

(2) an orientation where the lengthwise direction of the fixing film 114 is inclined at an angle $\theta$ to the rotational center line of the pressure roller 117 (rotational center of the fixing film 114 is tilted toward an upstream side in the conveying direction of the recording material relative to the rotational center line of the pressure roller 117 on the right side of FIG. 8B) (FIG. 8B); and (3) an orientation where the lengthwise direction of the fixing film 114 is inclined at an angle $-\theta$ to the rotational center line of the pressure roller 117 (rotational center of the fixing film 114 is tilted toward a downstream side in the conveying direction of the recording material relative to the rotational center line of the pressure roller 117 on the right side of FIG. 8C) (FIG. 8C).

Each of the orientations of the fixing film 114 and the generation state of the shifting force of the fixing film 114 is described below. The generation mechanism of the shifting force caused by the orientation of the film 114 is described above and therefore is not described here.

Figure 9:
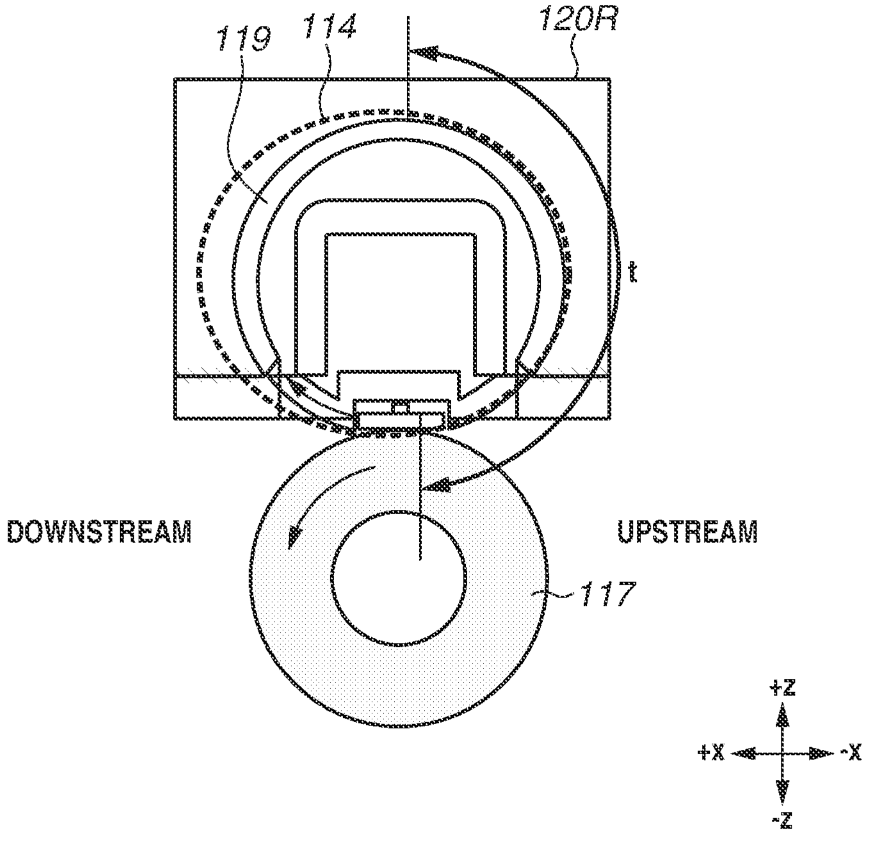
FIG. 9 is a diagram illustrating a rotational trajectory of the fixing film on a restriction surface of the flange according to the first example embodiment.

In the state of the above (1) illustrated in FIG. 8A, the lengthwise direction of the fixing film 114 is almost parallel to the extending direction of the rotational center line of the pressure roller 117. Thus, based on the above described generation mechanism of the shifting force, the shifting force that moves the fixing film 114 in the rotational axis direction of the pressure roller 117 is not generated. In this state, the shifting force is not generated in the fixing film 114. FIG. 9 is a cross-sectional view taken along F-F' in FIG. 8A and illustrates the rotational trajectory (dashed line) of the fixing film 114 when the fixing film 114 rotates. Since the fixing film 114 rotates when a driving force is received from the pressure roller 117, a force that presses the fixing film 114 acts on an area t on the upstream side in the conveying direction of the recording material in the flange 120R illustrated in FIG. 9. Consequently, the inner peripheral surface of the fixing film 114 rotates while being in contact with a guide surface (portion Sr_a in FIG. 8A) on the upstream side in the conveying direction of the recording material in the flange 120R. Similarly, in the flange 120L on the left side, the inner peripheral surface of the fixing film 114 rotates while being in contact with a guide surface (portion Sl_a) on the upstream side in the conveying direction of the recording material in the flange 120L. Then, the fixing film 114 rotates while being guided by the guide surfaces on the upstream side in the conveying direction of the recording material in the right flange 120R and the left flange 120L.

Next, in the state of (2) illustrated in FIG. 8B, the lengthwise direction of the fixing film 114 is tilted at an angle θ to an extending direction of the rotational center line of the pressure roller 117. In this state, a portion (portion Sl_b) on the downstream side in the conveying direction of the recording material in the guide surface 120La of the flange 120L and a portion (portion Sr_b) on the upstream side in the conveying direction of the recording material in the guide surface 120Ra of the flange 120R are in contact with the inner peripheral surface of the fixing film 114. Since the inner peripheral surface on the right side of the fixing film 114 is in contact with the portion Sr_b of the flange 120R and the inner peripheral surface on the left side of the fixing film 114 is in contact with the portion Sl_b of the flange 120L, the tilt of the fixing film 114 is restricted. Thus, the tilt angle θ of the fixing film 114 does not increase any more. This state indicates a state where the angle θ is largest, i.e., the state where the shifting force is largest. As illustrated in FIG. 8B, if the lengthwise direction of the fixing film 114 is tilted relative to the rotational center line of the pressure roller 117, then due to the above described generation mechanism of the shifting force, the shifting force in the right direction in FIG. 8B is generated. FIG. 8B illustrates a state where the fixing film 114 moves toward the flange 120R on the right side. The edge surface of the fixing film 114 comes into contact with the restriction surface 120Rb of the flange 120R, and movement of the fixing film 114 is restricted. As described above, in a case where the shifting force is generated in the fixing film 114 in the right direction in FIG. 8B, a portion (portion Sr_b) on the upstream side in the conveying direction of the recording material in the guide surface 120Ra of the flange 120R, which is placed on the right side, comes into contact with the inner peripheral surface of the fixing film 114 and guides the fixing film 114.

In the state of (3) illustrated in FIG. 8C, the lengthwise direction of the fixing film 114 is tilted at an angle −θ, which is in a direction opposite to the angle θ in (2), to the rotational center line of the pressure roller 117. The state of (3) illustrated in FIG. 8C and the state of (2) illustrated in FIG. 8B are plane-symmetrical to each other. Thus, by a mechanism similar to that in the above (2), the shifting force is generated in the left direction in the fixing film 114. Thus, the edge surface of the fixing film 114 comes into contact with the restriction surface 120Lb of the flange 120L, and the movement of the fixing film 114 is restricted. Simultaneously, a portion (portion Sl_c) on the upstream side in the conveying direction of the recording material in the guide surface 120La of the flange 120L, which is placed on the left side, comes into contact with the inner peripheral surface of the fixing film 114 and guides the fixing film 114.

More specifically, the flange on the side to which the fixing film 114 shifts by the shifting force applied to the fixing film 114 comes into contact with the inner peripheral surface of the fixing film 114 on the guide surface on the upstream side in the conveying direction of the recording material.

5. Tilt of Restriction Surface of Flange

Figure 10C:
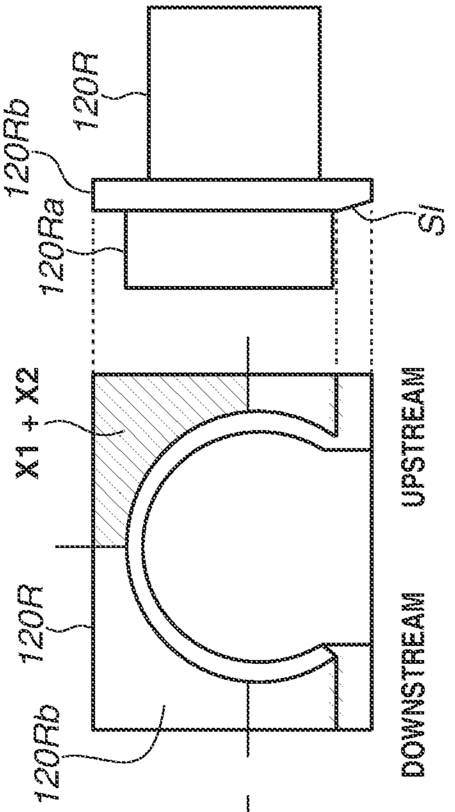
FIGS. 10A, 10B, and 10C are diagrams illustrating contact areas of the restriction surface of the flange with an edge surface of the fixing film corresponding to the tilt patterns of the fixing film according to the first example embodiment.
Figure 10B:
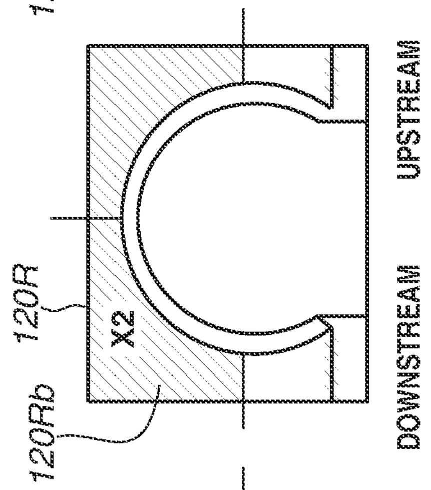
Figure 10A:
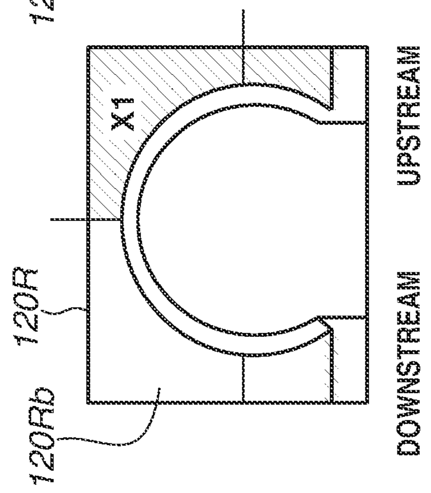

FIGS. 10A, 10B, and 10C are diagrams illustrating portions in the restriction surface 120Rb of the flange 120R with which the edge surface of the fixing film 114 comes into contact.

As illustrated in FIG. 7B, as viewed in a direction (z-axis direction) perpendicular to a surface of the fixing nip portion N, the restriction surface 120Rb is inclined in such a manner that as the perpendicular line 120R-Z of the restriction surface 120Rb comes closer to the center in the lengthwise direction of the stay 116 (y-axis direction), the perpendicular line 120R-Z goes further away from the center line C of the stay 116 toward the downstream side in the conveying direction of the recording material. Thus, the edge surface of the fixing film 114 easily comes into contact with a portion on the upstream side in the conveying direction of the recording material, i.e., a shaded portion X1 in FIG. 10A, in the restriction surface 120Rb. Consequently, the shifting movement of the fixing film 114 is restricted by the shaded portion X1 of the restriction surface 120Rb of the flange 120R.

Meanwhile, as illustrated in FIG. 6B, as viewed in the conveying direction of the recording material (+x-direction), the restriction surface 120Rb is inclined so that the closer the perpendicular line 120R-Z of the restriction surface 120Rb comes to the center in the lengthwise direction of the stay 116 (y-axis direction), the closer the perpendicular line 120R-Z comes to the pressure roller 117 (so as to go further away from the center line C of the stay 116). The edge surface of the fixing film 114 easily comes into contact with a shaded portion X2 in FIG. 10B.

In the flange 120R according to the present example embodiment, the above two tilts are combined together. Thus, the flange 120R is set so that when the fixing film 114 makes a shifting movement, the edge surface of the fixing film 114 hits a shaded portion (X1+X2: portion including both X1 and X2) illustrated in FIG. 10C.

6. Restriction of Edge Surface of Fixing Film

A description is given of how the flange 120R according to the present example embodiment restricts the movement of the fixing film 114 caused by the shifting force of the fixing film 114 and also suppresses damage to the fixing film 114. A case is described where, as illustrated in FIG. 8B, the fixing film 114 is shifted to the right in FIG. 8B.

Figure 11:
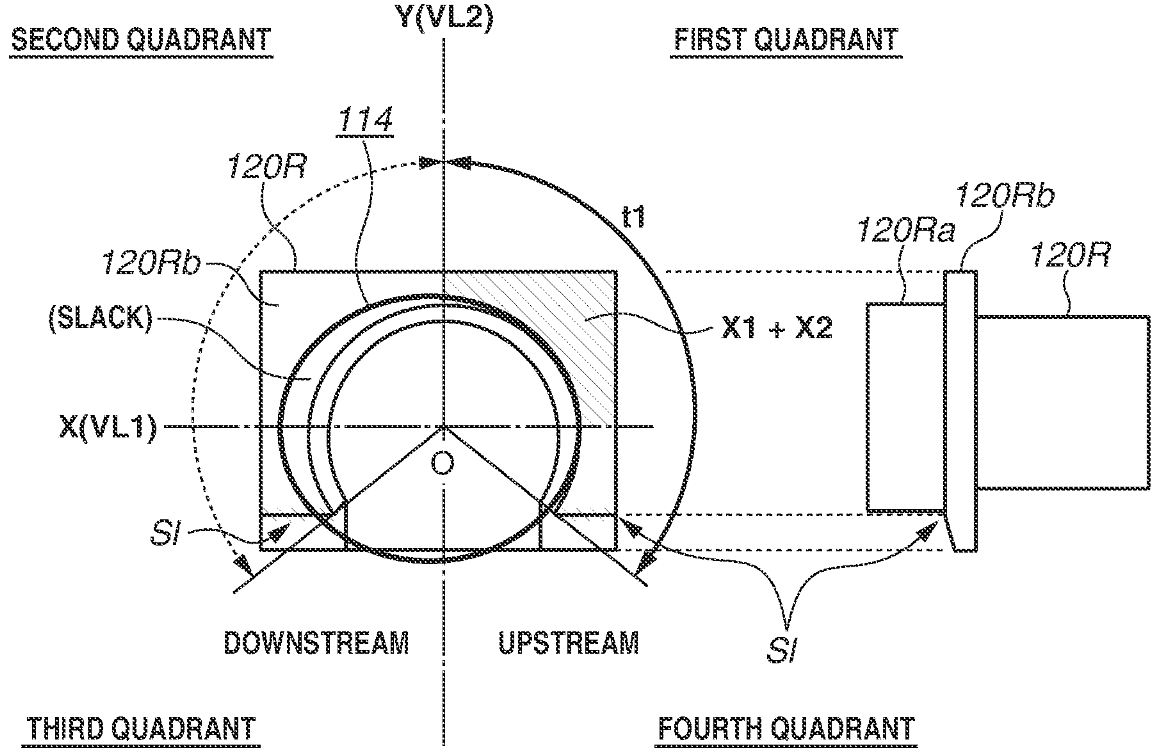
FIG. 11 is a diagram illustrating a contact state of the edge surface of the fixing film according to the first example embodiment with the restriction surface of the flange, and a trajectory of the fixing film.

FIG. 11 is a front view of the restriction surface 120Rb of the flange 120R. In FIG. 11, for the sake of convenience, a general XY-coordinate plane is applied to the restriction surface 120Rb, with an origin point O at the center of the fixing film 114. The center (origin point O) of the fixing film 114 is described. In a cross section perpendicular to the lengthwise direction of the fixing film 114 (y-axis direction), an intersection of a first virtual line VL1 and a second virtual line VL2 is the center (origin point O). The first virtual line VL1 is a virtual line passing through the widest portion of the fixing film 114 in the conveying direction of the recording material. The second virtual line VL2 is a virtual line passing through the center of the fixing nip portion N in the conveying direction of the recording material and extending in a direction perpendicular to the conveying direction of the recording material. When the first virtual line VL1 is an X-axis and the second virtual line VL2 is a Y-axis, the restriction surface 120Rb is divided by the X-axis and the Y-axis into four areas, namely first, second, third, and fourth quadrants. The first and fourth quadrants are areas on the upstream side in the conveying direction of the recording material. The second and third quadrants are areas on the downstream side in the conveying direction of the recording material. Further, the first and second quadrants are areas opposite to the side where the fixing nip portion N is located relative to the first virtual line VL1. The third and fourth quadrants are areas on the side where the fixing nip portion N is located relative to the first virtual line VL1.

The rotational trajectory of the edge surface of the fixing film 114 is illustrated in FIG. 11, and the inner peripheral surface of the fixing film 114 is guided while being in contact with the guide surface 120Ra of the flange 120R in parts of the first and fourth quadrants (range of a solid arrow t1 in FIG. 11). In the second and third quadrants, the fixing film 114 is slack and is in a free and separate state not guided by the guide surface 120Ra of the flange 120R (range of a dotted arrow in FIG. 11).

The inner peripheral surface of an area of the fixing film 114 corresponding to the areas of the second and third quadrants of the flange 120R is less likely to come into contact with the guide surface 120Ra of the flange 120R, and therefore is less likely to be backed up by the guide surface 120Ra. If a part of the fixing film 114 of which the inner peripheral surface is not backed up is brought into contact with the restriction surface 120Rb of the flange 120R, folding or buckling of the edge surface of the fixing film 114 is likely to occur. This may result in breakage of the fixing film 114. To deal with this problem, in the flange 120R according to the present example embodiment, the flange restriction surface 120Rb has a tilt. Due to the tilt of the restriction surface 120Rb, in the second and third quadrants, the edge surface of the fixing film 114 does not come into contact with the restriction surface 120Rb or comes into contact with the restriction surface 120Rb with a weaker force than that in the first and fourth quadrants. Thus, in the second and third quadrants, the fixing film 114 is less likely to be damaged.

The edge surface of the fixing film 114 easily comes into contact with the area of the first quadrant of the restriction surface 120Rb due to the tilt of the restriction surface 120Rb. Meanwhile, the inner peripheral surface of the fixing film 114 corresponding to this area comes into contact with and is backed up by the guide surface 120Ra of the flange 120R. Thus, folding or buckling is less likely to occur to the edge surface of the fixing film 114. Further, the first quadrant of the restriction surface 120Rb is composed of a flat surface or a surface close to a flat surface. Thus, a fluctuation in stress applied to the fixing film 114 is the smallest. Damage caused to the fixing film 114 by the shifting force of the fixing film 114 is thus minimized.

Similarly to the first quadrant, the area of the fourth quadrant of the restriction surface 120Rb is an area in which the inner peripheral surface of the fixing film 114 is backed up by the guide surface 120Ra of the flange 120R. More specifically, the area of the fourth quadrant of the restriction surface 120Rb is an area where, even if the edge surface of the fixing film 114 comes into contact with the restriction surface 120Rb, folding or buckling of the fixing film 114 is less likely to occur.

The fourth quadrant is a portion where the restriction surface 120Rb starts in the rotational direction of the fixing film 114. Thus, the slope-shaped portion Sl is formed in the fourth quadrant. However, the area of the fourth quadrant includes both the slope-shaped portion Sl and the restriction surface 120Rb. Thus, it is more desirable to restrict the shifting of the fixing film 114 in the first quadrant portion, in which the entire area is a flat surface, than restrict the shifting force of the fixing film 114 in the area of the fourth quadrant because a fluctuation in stress applied to the fixing film 114 is smaller therein.

As described above, the shifting movement of the fixing film 114 is restricted mainly in the area of the first quadrant in the restriction surface 120Rb of the flange 120R illustrated in FIG. 11, whereby it is possible to reduce the damage caused to the end portion of the fixing film 114.

On the other hand, in a case where the fixing film 114 is shifted to the left side as illustrated in FIG. 8C, the shifting of the fixing film 114 is restricted in a first quadrant of the restriction surface 120Lb of the flange 120L by a similar configuration. This achieves a configuration in which, even if the fixing film 114 is shifted in either direction in the lengthwise direction thereof, folding or buckling of the end portion of the fixing film 114 is less likely to occur.

7. Tilt of Guide Surface of Flange

Next, the tilt of the guide surface 120Ra of the flange 120R is described. The guide surface 120Ra of the flange 120R comes into contact with the inner peripheral surface of the fixing film 114 and restricts the rotational trajectory of the fixing film 114.

As described with reference to FIG. 17, it is necessary to prevent the extremity portion J of the guide surface 120Ra from locally coming into strong contact with the inner peripheral surface of the fixing film 114.

Thus, an orientation that may be taken by the fixing film and the stress applied to the fixing film at this time are described by comparing the fixing device 105 according to the present example embodiment with a fixing device according to a comparative example.

Figure 12A:
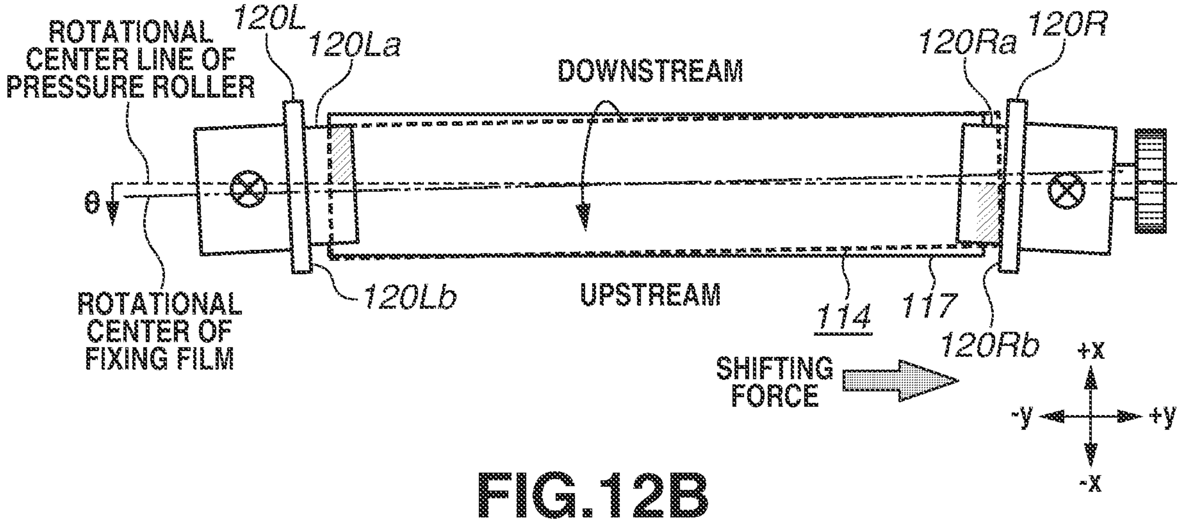
FIGS. 12A, 12B, and 12C are diagrams illustrating comparison between contact states between a guide surface of the flange and an inner peripheral surface of the fixing film in the fixing device according to the first example embodiment.
Figure 12B:
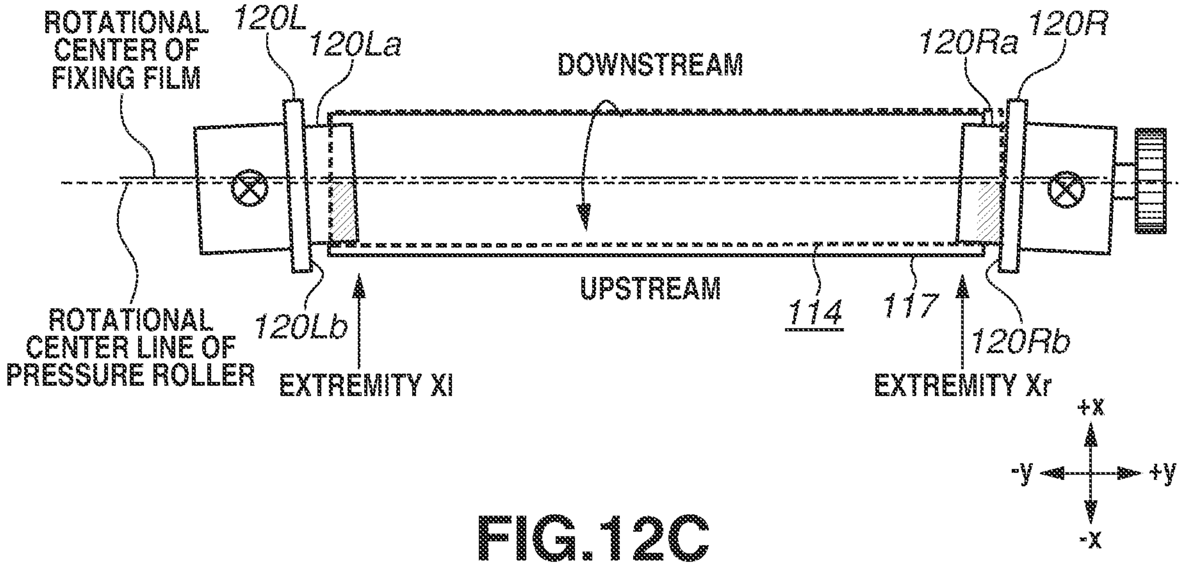
Figure 12C:
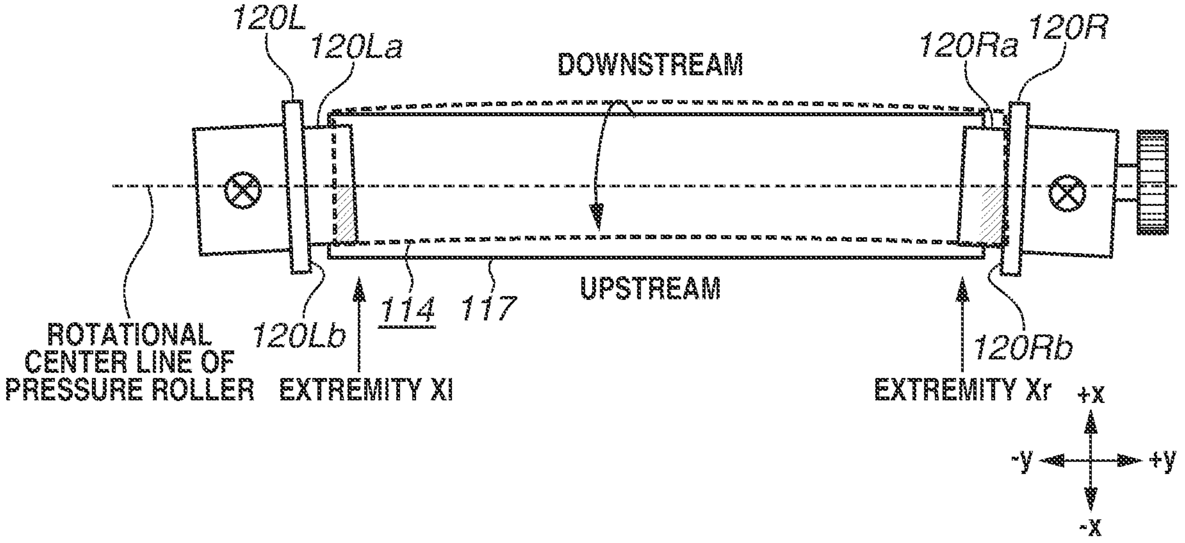

First, with reference to FIGS. 12A, 12B, and 12C, the fixing device 105 according to the present example embodiment is described. FIG. 12A illustrates the state where the lengthwise direction of the fixing film 114 is inclined at an angle θ to the rotational axis direction of the pressure roller 117, and the fixing film 114 is shifted to the right side of FIG. 12A (dashed line). The guide surface 120Ra of the flange 120R on the right side of FIG. 12A comes into planar contact with the inner peripheral surface of the fixing film 114. Thus, the fixing film 114 is not subjected to a large stress. On the other hand, the guide surface 120La of the flange 120L on the left side of FIG. 12A also comes into planar contact with the inner peripheral surface of the fixing film 114 and maintains the orientation in which the fixing film 114 rotationally moves. Thus, the fixing film 114 is not subjected to a large stress.

FIG. 12B illustrates a case where the lengthwise direction of the fixing film 114 is parallel to the rotational center line of the pressure roller 117 in the state where the fixing film 114 is shifted to the right side of FIG. 12B (dashed line). This case can occur when a jam occurs with a recording material P nipped in the fixing nip portion N due to an emergency stop caused by the user, and the recording material P is removed.

Even in such a case, in the fixing device 105 according to the present example embodiment, an extremity Xr of the guide surface 120Ra and an extremity Xl of the guide surface 120La are away from the inner peripheral surface of the fixing film 114. This is because the guide surfaces 120Ra and 120La of the flanges 120R and 120L are inclined so that the extremities Xr and Xl, which are portions on the upstream side in the conveying direction of the recording material in the guide surfaces 120Ra and 120La, are away from the inner surface of the fixing film 114.

FIG. 12C illustrates the state where, in a case where multi-feed of recording materials P occurs or in a case where a jam is cleared with a strong force by the user, the fixing film 114 having flexibility bends into an arched shape (dashed line) toward the conveying direction of the recording material. The extremity Xr of the guide surface 120Ra and the extremity Xl of the guide surface 120La come closer to the inner peripheral surface of the fixing film 114 than those in the state of FIG. 12B. However, since the extending directions (generatrix directions) of the guide surfaces 120Ra and 120La are inclined in the above-described directions, the damage caused to the fixing film 114 is reduced.

Figure 13A:
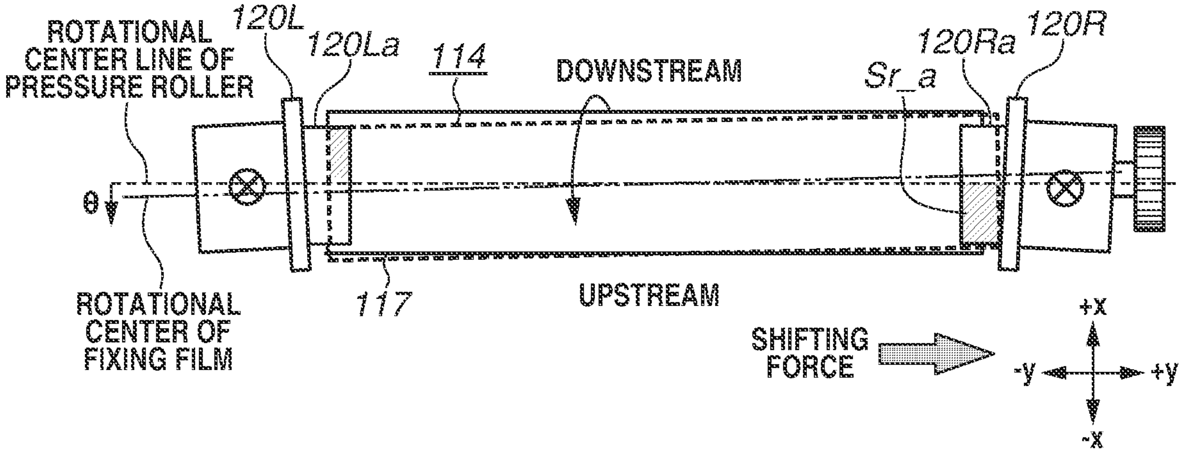
FIGS. 13A, 13B, and 13C are diagrams illustrating contact states between a guide surface of a flange and an inner peripheral surface of a fixing film in a fixing device according to a comparative example.
Figure 13B:
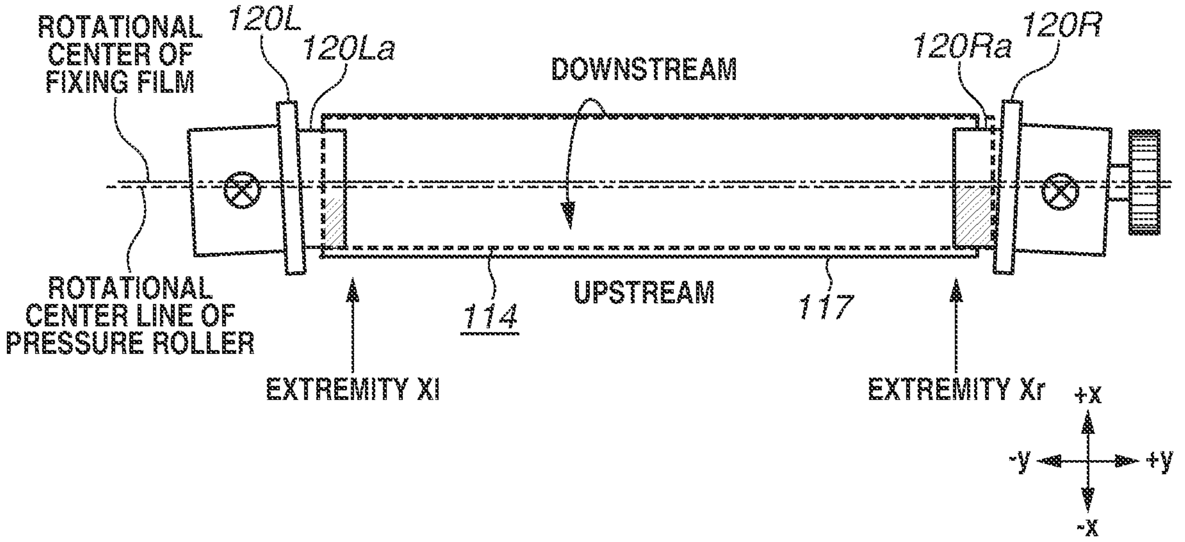
Figure 13C:
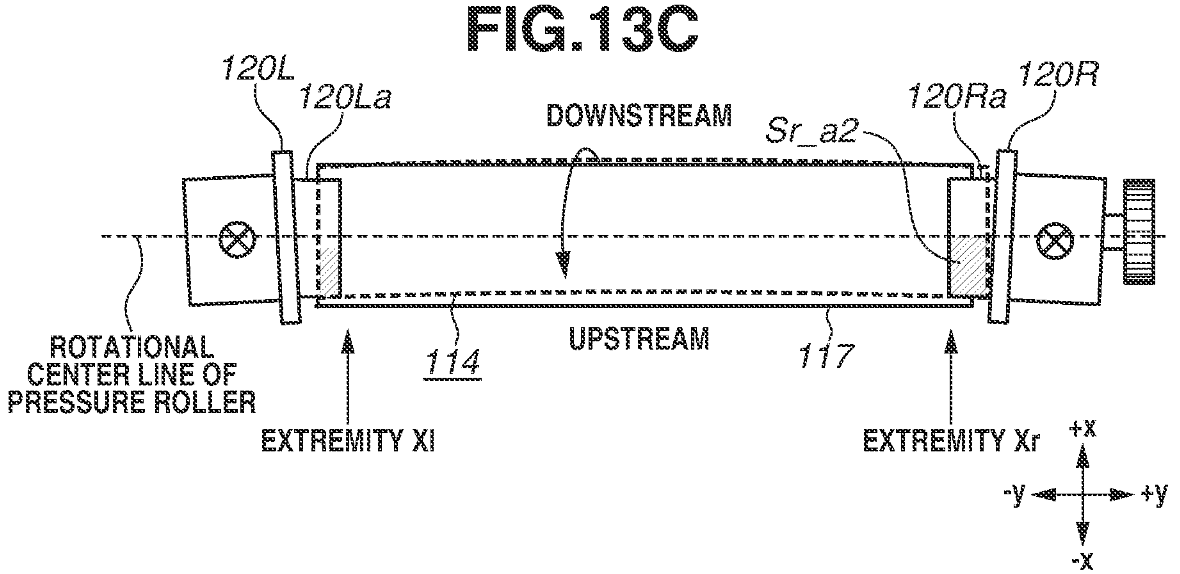

On the other hand, FIGS. 13A, 13B, and 13C each illustrate a fixing device as a comparative example. In the fixing device according to the comparative example, the restriction surface 120Rb of the flange 120R is inclined similarly to that according to the present example embodiment. However, the extending direction (generatrix direction) of the guide surface 120Ra is parallel to the rotational center line of the pressure roller 117.

FIG. 13A illustrates a state where the lengthwise direction of the fixing film 114 is inclined at an angle θ to the rotational axis direction of the pressure roller 117, and the fixing film 114 is shifted to the right side of FIG. 13A. In this case, the extremities of the guide surfaces 120Ra and 120La of the flanges 120R and 120L do not come into contact with the inner surface of the fixing film 114. Thus, the fixing film 114 is less likely to be damaged.

FIG. 13B illustrates a case where the lengthwise direction of the fixing film 114 is parallel to the rotational center line of the pressure roller 117 in the state where the fixing film 114 is shifted to the right side of FIG. 13B. In this case, the extremity Xr of the guide surface 120Ra and the extremity Xl of the guide surface 120La come into contact with the inner peripheral surface of the fixing film 114. However, the fixing film 114, which is less likely to locally come into contact with the extremities Xr and Xl, is not subjected to a large damage.

FIG. 13C illustrates a state where, in a case where multi-feed of recording materials P occurs or in a case where a jam is cleared with a strong force by the user, the fixing film 114 having flexibility bends into an arched shape toward the conveying direction of the recording material. In this state, there is a case where the extremity Xr of the guide surface 120Ra and the extremity Xl of the guide surface 120La locally bite into the inner peripheral surface of the fixing film 114, portions into which the extremities Xr and Xl have bitten are folded, and the fixing film 114 is broken.

Based on the above description, the fixing device 105 according to the present example embodiment has an effect that in a case where the film 114 shifts, the edge surfaces and the inner peripheral surface of the fixing film 114 are less likely to be damaged than in the comparative example.

In the configuration of the present example embodiment, the flange 120R is tilted while maintaining a right angle between the restriction surface 120Rb and the guide surface 120Ra of the flange 120R. However, the disclosure is not limited to this.

Further, an optimal value of the amount of tilt of the flange 120R varies depending on the shifting force to be generated and strength of the fixing film 114, and therefore needs to be appropriately set for each configuration.

In the configuration of the present example embodiment, a setting is made so that both the flanges 120R and 120L are fitted onto the one stay 116, whereby a tilt occurs between the perpendicular line 120R-Z and the stay center line C. In such a configuration, the tilts of left and right flanges are determined based on the stay center line C. Thus, the tilt can be maintained with small variation between the left and right flanges and also with high accuracy.

In the present example embodiment, an example has been described where a technical idea is realized by the shapes of the fitting portions between the stay 116 and the flanges 120R and 120L. However, the disclosure is not limited to this example embodiment and can be modified in various manners.

Configurations of first and second modifications of the present example embodiment are illustrated and described below.

Figure 14A:
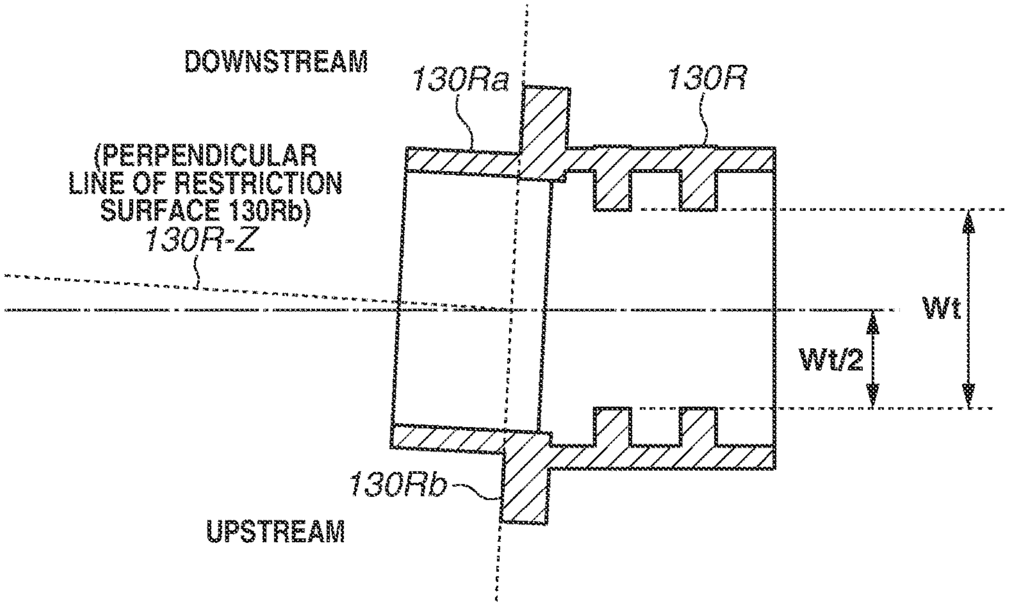
FIG. 14A is a diagram illustrating a cross section parallel to a fixing nip portion of a flange according to a first modification of the first example embodiment.

A flange 130R illustrated in FIG. 14A has a shape in which, in contrast to the flange 120R, a level difference is not provided between fitting portions where the stay 116 is fitted, and perpendicular lines 130R-Z and 130L-Z of restriction surfaces 130Rb and 130Lb of the flange 130R are tilted.

In the flange 130R, a width of the portion where the stay 116 is fitted is Wt, and a contour of a portion 130Rh of the flange 130R further on the end portion side of the stay 116 than the restriction surface 130Rb is parallel to the stay 116. Further, the flange 130R has a shape in which a tilt occurs in the perpendicular line 130R-Z of the restriction surface 130Rb relative to the center line C of the stay 116.

Figure 14B:
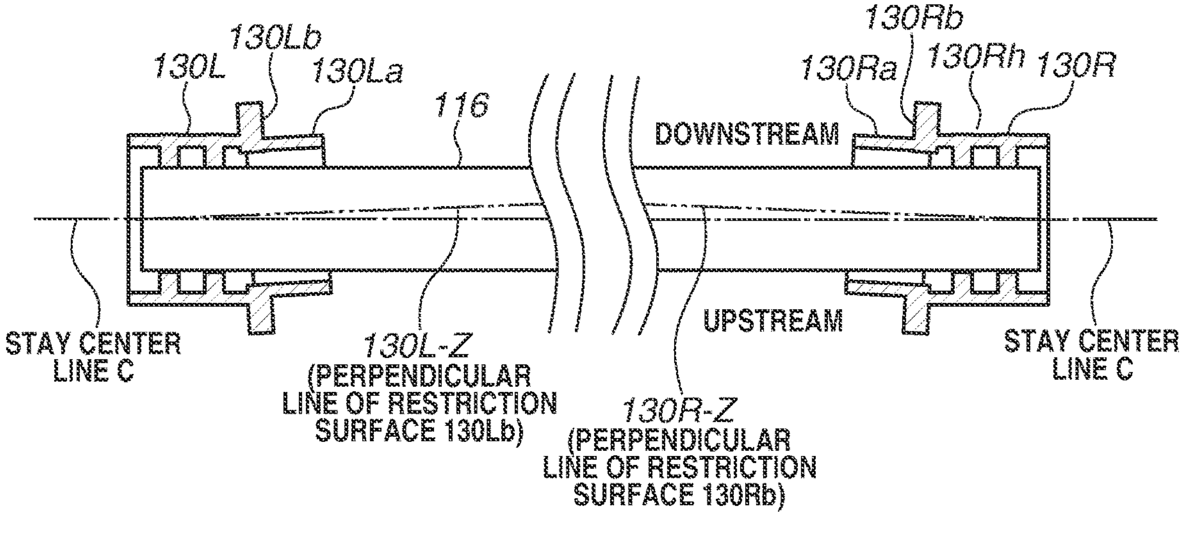
FIG. 14B is a diagram illustrating a fitting state of the flange and a stay in the cross section.

In this configuration, if the flange 130R and a flange 130L, which has a configuration similar to that of the flange 130R, are fitted onto the same stay 116, then as illustrated in FIG. 14B, the restriction surfaces 130Rb and 130Lb of the flanges 130R and 130L face each other. Then, the perpendicular lines 130R-Z and 130L-Z of the restriction surfaces 130Rb and 130Lb are both directed downstream in the conveying direction of the recording material. Thus, in the first modification, an effect similar to that of the first example embodiment is obtained.

Figure 15:
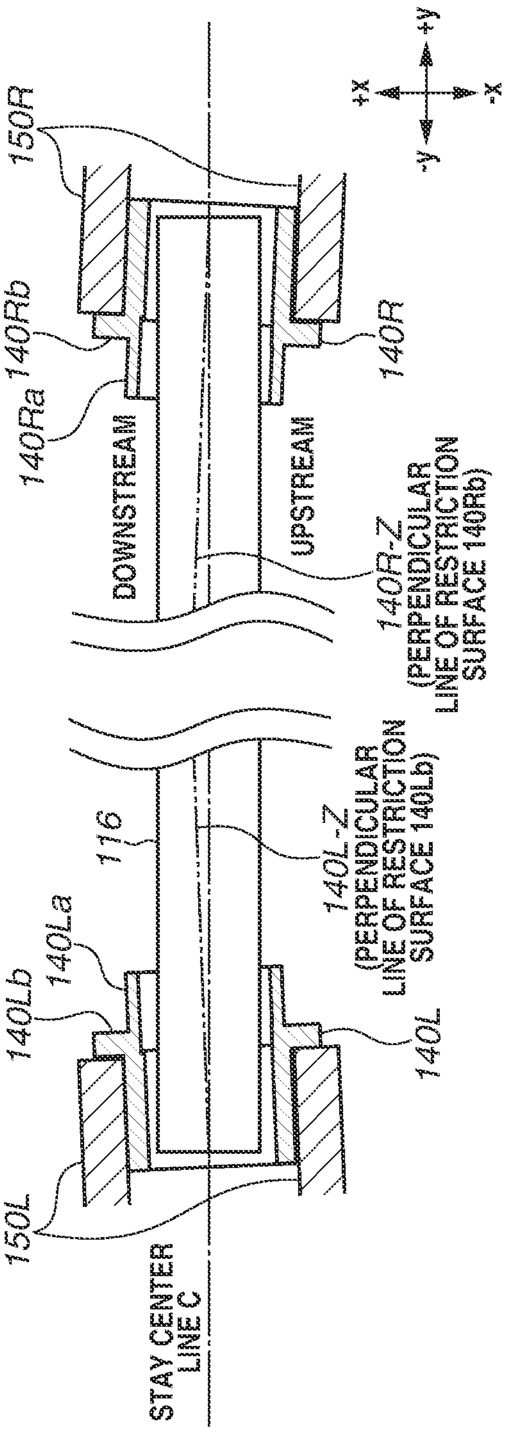
FIG. 15 is a diagram illustrating a configuration of a flange according to a second modification of the first example embodiment and a supporting member of the flange.

FIG. 15 is a diagram illustrating a restriction surface 140Rb of a flange 140R according to a second modification as viewed in the z-axis direction. Neither the flange 140R nor a flange 140L is fitted onto the stay 116, and the flanges 140R and 140L are held so that tilts occur in the flanges 140R and 140L by flange supporting members 150R and 150L in the fixing device 105.

In this configuration, restriction surfaces 140Rb and 140Lb of the flanges 140R and 140L face each other, and perpendicular lines 140R-Z and 140L-Z of the restriction surfaces 140Rb and 140Lb are both directed downstream in the conveying direction of the recording material. Thus, also in the second modification, an effect similar to that of the first example embodiment is obtained.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

What is claimed is:

1. A fixing device comprising:

a cylindrical film;

a nip portion forming member configured to be in contact with an inner surface of the film, the nip forming member being provided along a longitudinal direction of the film;

a metallic stay configured to reinforce the nip portion forming member, the stay being provided along the longitudinal direction of the film in an inner space of the film;

a roller configured to form a nip portion with the nip portion forming member across the film; and a restriction member configured to restrict a shifting movement of the film in a rotational axis direction of the roller, the restriction member including a first surface that is opposed to an edge surface of the film and with which the edge surface comes into contact when the film makes the shifting movement, and a second surface opposed to the inner surface of the film and configured to guide rotation of the film, wherein a recording material on which an image is formed is heated while being conveyed in the nip portion, and the image is fixed to the recording material, wherein as viewed in a conveying direction of the recording material, the first surface is inclined so that, as the first surface goes further away from the nip portion in a direction perpendicular to both the conveying direction and the rotational axis direction, the first surface inclines toward a direction coming closer to the metallic stay, and as viewed in the perpendicular direction, the first surface is inclined so that, as the first surface comes downstream in the conveying direction, the first surface inclines toward a direction going further away from the edge surface of the film, and wherein as viewed in the conveying direction, the second surface is inclined so that, as the second surface comes closer to a center in the rotational axis direction of the film, the second surface inclines toward a direction coming closer to the roller, and as viewed in the perpendicular direction, the second surface is inclined so that, as the second surface comes closer to the center of the film, the second surface inclines toward a direction going downstream in the conveying direction.

2. The fixing device according to claim 1, wherein the second surface is perpendicular to the first surface.

3. The fixing device according to claim 1, wherein the first surface is a flat surface, and where an inclination angle of a perpendicular line of the first surface relative to the rotational axis direction is a first angle as viewed in the perpendicular direction, the first angle is 0.5 degrees or more and 3.0 degrees or less.

4. The fixing device according to claim 3, wherein where an inclination angle of the perpendicular line of the first surface relative to the rotational axis direction is a second angle as viewed in the conveying direction, the second angle is 0.3 degrees or more and 1.5 degrees or less.

5. The fixing device according to claim 1:

wherein the restriction member is positioned relative to the metallic stay so that the first and second surfaces are inclined.

6. The fixing device according to claim 1, wherein the first surface is a flat surface, and an inclination angle of a perpendicular line of the first surface relative to the rotational axis direction as viewed in the perpendicular direction is greater than an inclination angle of the perpendicular line of the first surface relative to the rotational axis direction as viewed in the conveying direction.

7. The fixing device according to claim 1, wherein the nip portion forming member is a plate-like heater.

8. The fixing device according to claim 1, wherein the first surface of the restriction member is configured not to rotate with the film.

9. The fixing device according to claim 1, wherein the second surface is a cylindrical surface and the first surface is a flat surface perpendicular to a center line of the cylindrical surface, and wherein when viewed in the conveying direction (y-z axis) of the recording material in the nip portion, the center line is inclined in a downward orientation toward the nip portion, and when viewed in the perpendicular direction (x-y axis) of the recording material in the nip portion, the center line is angled outward in an outward orientation away from a center axis of the film.

10. A fixing device comprising:

a cylindrical film;

a nip portion forming member configured to be in contact with an inner surface of the film, the nip forming member being provided along a longitudinal direction of the film;

a metallic stay configured to reinforce the nip portion forming member, the stay being provided along the longitudinal direction of the film in the inner space of the film;

a roller configured to form a nip portion with the nip portion forming member across the film; and a restriction member configured to restrict a movement of the film in a rotational axis direction of the roller, the restriction member including a first surface that is opposed to an edge surface of the film in the rotational axis direction and with which the edge surface of the film comes into contact when the film moves in the rotational axis direction, and a second surface opposed to the inner surface of the film and configured to guide rotation of the film, wherein a recording material on which an image is formed is heated while being conveyed in the nip portion to fix the image on the recording material, and wherein as viewed in a conveying direction of the recording material, the second surface is inclined so that, as the second surface comes closer to a center in the rotational axis direction of the film, the second surface inclines toward a direction coming closer to the metallic stay, and wherein the restriction member is positioned relative to the metallic stay so that the second surface is inclined.

11. The fixing device according to claim 10, wherein the nip portion forming member is a plate-like heater.

12. A fixing device comprising:

a cylindrical film;

a heater provided in an inner surface of the film along a longitudinal direction of the film;

a supporting member provided in the inner surface of the film along the longitudinal direction of the film and configured to support the heater along the longitudinal direction of the film, the supporting member including a plurality of ribs elongated in a rotational direction of the film and arranged in the longitudinal direction of the film;

a metallic stay configured to reinforce the supporting member, the stay being provided along the longitudinal direction of the film in the inner space of the film;

a roller configured to form a nip portion with the heater across the film; and a restriction member configured to restrict a movement of the film in a rotational axis direction of the roller, the restriction member including a first surface that is opposed to an edge surface of the film in the rotational axis direction and with which the edge surface of the film comes into contact when the film moves in the rotational axis direction, and a second surface opposed to the inner surface of the film and configured to guide rotation of the film, wherein a recording material on which an image is formed is heated while being conveyed in the nip portion to fix the image on the recording material, and wherein, as viewed in a conveying direction of the recording material, the second surface is inclined so that, as the second surface comes closer to a center in the rotational axis direction of the film, the second surface inclines toward a direction coming closer to the metallic stay.

* * * * *